(12) United States Patent
Wintemute et al.

(10) Patent No.: US 9,976,822 B2
(45) Date of Patent: May 22, 2018

(54) SYSTEM AND METHOD FOR CONDITIONING AIR IN AN ENCLOSED STRUCTURE

(75) Inventors: David Martin Wintemute, Trois-Rivieres (CA); Remi Fortin, Maddington Falls (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 1599 days.

(21) Appl. No.: 13/426,793

(22) Filed: Mar. 22, 2012

(65) Prior Publication Data

US 2013/0248147 A1    Sep. 26, 2013

(51) Int. Cl.
| | | |
|---|---|---|
| F24F 12/00 | (2006.01) | |
| F28F 27/02 | (2006.01) | |
| F28D 15/02 | (2006.01) | |
| F28D 19/04 | (2006.01) | |

(52) U.S. Cl.
CPC ............ *F28F 27/02* (2013.01); *F24F 12/001* (2013.01); *F28D 15/02* (2013.01); *F28D 19/041* (2013.01); *F24F 2203/10* (2013.01); *Y02B 30/563* (2013.01)

(58) Field of Classification Search
USPC ....... 165/294, 252, 201, 103, 100, 227, 228, 165/297, 296
See application file for complete search history.

(56) References Cited

U.S. PATENT DOCUMENTS

| | | | |
|---|---|---|---|
| 2,522,484 A | * | 9/1950 | Ringquist et al. ................ 62/90 |
| 4,841,733 A | * | 6/1989 | Dussault et al. .................. 62/93 |
| 5,179,998 A | | 1/1993 | Des Champs |
| 5,325,676 A | * | 7/1994 | Meckler ............................ 62/93 |
| 5,351,497 A | | 10/1994 | Lowenstein |
| 5,373,704 A | | 12/1994 | McFadden |
| 5,542,968 A | | 8/1996 | Belding |

(Continued)

OTHER PUBLICATIONS

"Desiccant Enhanced Evaporative Air Conditioning: Parametric Analysis and Design," J. Woods and E. Kozunal, Presented at the Second International Conference on Building Energy and Environment (COBEE2012), Conference Paper, Oct. 2012.

(Continued)

*Primary Examiner* — Devon Russell
(74) *Attorney, Agent, or Firm* — Schwegman Lundberg & Woessner, P.A.

(57) ABSTRACT

An energy exchange system includes a supply flow path including a central sub-path connected to a bypass sub-path that is, in turn, connected to a delivery sub-path that connects to the enclosed structure. A sensible heat exchanger configured to condition the supply air is disposed within the central sub-path. The bypass sub-path connects to the central sub-path upstream from the sensible heat exchanger within the central sub-path. A first coil configured to further condition the supply air is disposed within the central sub-path downstream from the sensible heat exchanger. A bypass damper is disposed within the bypass sub-path. The bypass damper is configured to be selectively opened and closed. The bypass damper allows at least a portion of the supply air to pass through the bypass sub-path into the delivery sub-path and bypass the sensible heat exchanger and the first coil when the bypass damper is open.

13 Claims, 15 Drawing Sheets

(56) References Cited

U.S. PATENT DOCUMENTS

| | | |
|---|---|---|
| 5,580,369 A | 12/1996 | Belding |
| 5,638,900 A | 6/1997 | Lowenstein |
| 5,650,221 A | 7/1997 | Belding |
| 5,660,048 A | 8/1997 | Belding |
| 5,685,897 A | 11/1997 | Belding |
| 5,727,394 A | 3/1998 | Belding |
| 5,758,508 A | 6/1998 | Belding |
| 5,791,153 A * | 8/1998 | Belding et al. .................. 62/93 |
| 5,826,434 A * | 10/1998 | Belding et al. .................. 62/90 |
| 5,860,284 A | 1/1999 | Goland |
| 5,890,372 A | 4/1999 | Belding |
| 6,003,327 A | 12/1999 | Belding |
| 6,018,953 A | 2/2000 | Belding |
| 6,050,100 A | 4/2000 | Belding |
| 6,079,481 A | 6/2000 | Lowenstein |
| 6,176,101 B1 | 6/2001 | Lowenstein |
| 6,363,218 B1 | 3/2002 | Lowenstein |
| 6,568,466 B2 | 5/2003 | Lowenstein |
| 6,684,649 B1 * | 2/2004 | Thompson .................. 62/93 |
| 6,745,826 B2 | 6/2004 | Lowenstein |
| 6,848,265 B2 | 2/2005 | Lowenstein |
| 7,047,751 B2 | 5/2006 | Dinnage |
| 7,077,187 B2 | 7/2006 | Cargnelli |
| 7,104,082 B1 * | 9/2006 | Moratalla .................. 62/271 |
| 7,269,966 B2 | 9/2007 | Lowenstein |
| 7,306,650 B2 | 12/2007 | Slayzak |
| 7,318,320 B2 * | 1/2008 | Yabu et al. .................. 62/94 |
| 7,966,841 B2 | 6/2011 | Lowenstein |
| 8,631,661 B2 * | 1/2014 | Teige et al. .................. 62/94 |
| 8,828,128 B1 * | 9/2014 | Parker et al. .................. 96/125 |
| 2005/0262862 A1 * | 12/2005 | Moffitt .................. 62/271 |
| 2010/0242507 A1 * | 9/2010 | Meckler .................. 62/94 |
| 2010/0319370 A1 | 12/2010 | Kozubal |
| 2011/0308265 A1 | 12/2011 | Phannavong |
| 2012/0125020 A1 | 5/2012 | Vandermeulen |
| 2012/0125021 A1 | 5/2012 | Vandermeulen |
| 2012/0125031 A1 | 5/2012 | Vandermeulen |
| 2012/0125405 A1 | 5/2012 | Vandermeulen |
| 2012/0125581 A1 | 5/2012 | Allen |
| 2012/0131934 A1 | 5/2012 | Vandermeulen |
| 2012/0131937 A1 | 5/2012 | Vandermeulen |
| 2012/0131938 A1 | 5/2012 | Vandermeulen |
| 2012/0131939 A1 | 5/2012 | Vandermeulen |
| 2012/0131940 A1 | 5/2012 | Vandermeulen |
| 2012/0132513 A1 | 5/2012 | Vandermeulen |
| 2012/0186281 A1 | 7/2012 | Vandermeulen |
| 2012/0186787 A1 * | 7/2012 | Dinh .................. 165/104.26 |

OTHER PUBLICATIONS

"Performance analysis of a liquid desiccant and membrane contactor hybrid air-conditioning system," Bergero, Chiari, Energy and Buildings, 2010.

AAONAIRE Energy Recovery Units Users Information Manual.

* cited by examiner

SYSTEM AND METHOD FOR CONDITIONING AIR IN AN ENCLOSED STRUCTURE

BACKGROUND

The subject matter described herein relates generally to a system and method for conditioning air in an enclosed structure, and more particularly, to system and method for independently controlling temperature and humidity within the enclosed structure.

Enclosed structures, such as occupied buildings, factories and animal barns, generally include an HVAC system for conditioning ventilated and/or recirculated air in the structure. The HVAC system includes a supply air flow path and a return and/or exhaust air flow path. The supply air flow path receives air, for example outside or ambient air, re-circulated air, or outside or ambient air mixed with re-circulated air, and channels and distributes the air into the enclosed structure. The air is conditioned by the HVAC system to provide a desired temperature and humidity of supply air discharged into the enclosed structure. The exhaust air flow path discharges air back to the environment outside the structure. Without energy recovery, conditioning the supply air typically requires a significant amount of auxiliary energy. This is especially true in environments having extreme outside air conditions that are much different than the required supply air temperature and humidity. Accordingly, energy exchange or recovery systems are typically used to recover energy from the exhaust air flow path. Energy recovered from air in the exhaust flow path is utilized to reduce the energy required to condition the supply air.

A Dedicated Outdoor Air System (DOAS) conditions ambient air to desired supply air conditions through a combination of heating, cooling, dehumidification, and/or humidification elements and components. A typical DOAS may include a vapor compression system or a desiccant-based system. When the ambient air is hot and humid, the vapor compression system typically overcools the supply air in order to dehumidify the air. However, this process is inefficient because the air is usually reheated before it is supplied.

In many environments, there is a need to heat or cool the air, but maintain a desired humidity. Conversely, in some environments, one may desire to vary the humidity but maintain a current temperature. However, typical conditioning systems are not configured to vary temperature (sensible energy) and humidity (latent energy) independently of one another. Therefore, while a temperature level may be changed to a desirable level, the resulting change in humidity (or vice versa) may be undesirable.

For example, if an enclosed space is being cooled to a particular temperature by a system, but then the outdoor air temperature decreases, the amount of energy available to reheat the air may also decrease. Consequently, the air supplied to the enclosed space may be lower than desired. While the humidity level within the room may be suitable, the system may be overcooling the enclosed space.

SUMMARY

Certain embodiments provide an energy exchange system configured to provide supply air to an enclosed structure. The system includes a supply flow path including a central sub-path connected to a bypass sub-path that is, in turn, connected to a delivery sub-path that connects to the enclosed structure. A sensible heat exchanger configured to condition the supply air is disposed within the central sub-path. The bypass sub-path connects to the central sub-path upstream from the sensible heat exchanger within the central sub-path. A first coil configured to further condition the air is disposed within the central sub-path downstream from the sensible heat exchanger.

A bypass damper is disposed within the bypass sub-path. The bypass damper is configured to be selectively opened and closed. The bypass damper allows at least a portion of the supply air to pass through the bypass sub-path into the delivery sub-path and bypass the sensible heat exchanger and the first coil when the bypass damper is open.

The supply flow path may also include a re-direct sub-path that reconnects to the sensible heat exchanger. The sensible heat exchanger is configured to receive re-directed supply air within the re-direct sub-path and pass the re-directed supply air to the delivery sub-path. The supply flow path may also include a pre-delivery sub-path that is connected between the central sub-path and the delivery sub-path. At least a portion of the supply air downstream of the first coil within the central sub-path is passed to the pre-delivery sub-path.

The system may also include a re-direct damper disposed within the re-direct sub-path. The re-direct damper is configured to be selectively opened and closed in order to open and close, respectively, the re-direct sub-path.

The system may also include a pre-delivery damper disposed within the pre-delivery sub-path. The pre-delivery damper is configured to be selectively opened and closed in order to open and close, respectively, the pre-delivery sub-path.

The sensible heat exchanger may include a plate heat exchanger. The plate heat exchanger may include a plurality of parallel plates defining first and second levels configured to allow supply air to pass therethrough. The first level may be oriented parallel with a first axis, while the second level may be oriented parallel with a second axis that is perpendicular to the first axis. Alternatively, the sensible heat exchanger may include a sensible wheel, a heat pipe, or a heat recovery run-around loop.

The system may also include an energy recovery device having a portion disposed within the central sub-path upstream from the bypass sub-path and the sensible heat exchanger.

The first coil may include sealed tubes containing liquid. Liquid coolant or a heated liquid may be circulated through the tubes. For example, a compressor pump may be fluidly connected to the first coil and configured to pump a fluid through the tubes.

The system may also include at least one temperature or humidity sensor within the supply flow path. A control unit may be operatively connected to the bypass damper, the at least one sensor, the energy recovery device, and/or other components of the system. The control unit, such as a computing device, digital thermostat, humidistat, or the like, may automatically control operation of the system based on input temperature and humidity set-points.

The system may also include a second coil disposed within the delivery sub-path. The second coil may be configured to re-heat or re-cool the supply air before the supply air passes into the enclosed structure.

The system may also include a fluid circulation circuit connected to the first coil and/or the second coil. The fluid circulation circuit may be configured to circulate fluid to the first and/or second coils. The fluid circulation circuit may include a switching device configured to selectively switch the first coil between a cooling coil and a heating coil.

Certain embodiments provide a method of operating an energy exchange system to provide supply air to an enclosed structure. The energy exchange system may include a supply flow path having a central sub-path connected to a bypass sub-path that is, in turn, connected to a delivery sub-path that connects to the enclosed structure.

The method may include selectively opening and closing a bypass damper within the bypass sub-path in order to open and close the bypass sub-path, directing the supply air to the enclosed structure and bypassing a sensible heat exchanger and first coil within the central sub-path when the bypass damper is open, and directing the supply air to the sensible heat exchanger and the first coil within the central sub-path when the bypass damper is closed.

The method may also include selectively opening and closing a re-direct damper within a re-direct sub-path connected to the central sub-path, wherein the re-direct sub-path is downstream from the central sub-path. The method may include re-directing at least a portion of the supply air to the sensible heat exchanger when the re-direct damper is open, and preventing the at least a portion of the supply air from being re-directed to the sensible heat exchanger when the re-direct damper is closed.

The method may also include selectively opening and closing a pre-delivery damper within a pre-delivery sub-path connected to the central sub-path, wherein the pre-delivery sub-path is downstream from the central sub-path. The method may include delivering at least a portion of the supply air to the delivery sub-path when the pre-delivery damper is open, and preventing the portion of the supply air from being delivered to the delivery sub-path when the pre-delivery damper is closed.

The method may also include pre-conditioning the supply air with an energy recovery device disposed within the central sub-path upstream from the bypass sub-path.

The method may also include monitoring one or both of temperature or humidity within the supply flow path. The method may also include controlling the selectively opening and closing the damper(s) with a control unit.

The method may also include re-heating or re-cooling the supply air within the delivery sub-path before the supply air passes into the enclosed structure. The method may also include circulating one of cooling or heating fluid to the first coil.

Certain embodiments provide a method of providing conditioned air to an enclosed structure. The method may include receiving supply air at an energy recovery device, pre-conditioning the supply air with the energy recovery device, directing pre-conditioned supply air to a heat exchanger positioned downstream from the energy recovery device, conditioning the pre-conditioned supply air with the heat exchanger, re-directing conditioned supply air from the heat exchanger back to the heat exchanger, further conditioning the conditioned supply air with the heat exchanger, and discharging further conditioned supply air from the heat exchanger into the enclosed structure. The heat exchanger may include a fixed plate heat exchanger. One or both of the conditioning and further conditioning may include adding heat to the pre-conditioned supply air and/or the further conditioned supply air during a winter mode of operation. The method may also include selectively operating a damper upstream from the heat exchanger.

DETAILED DESCRIPTION OF THE DRAWINGS

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
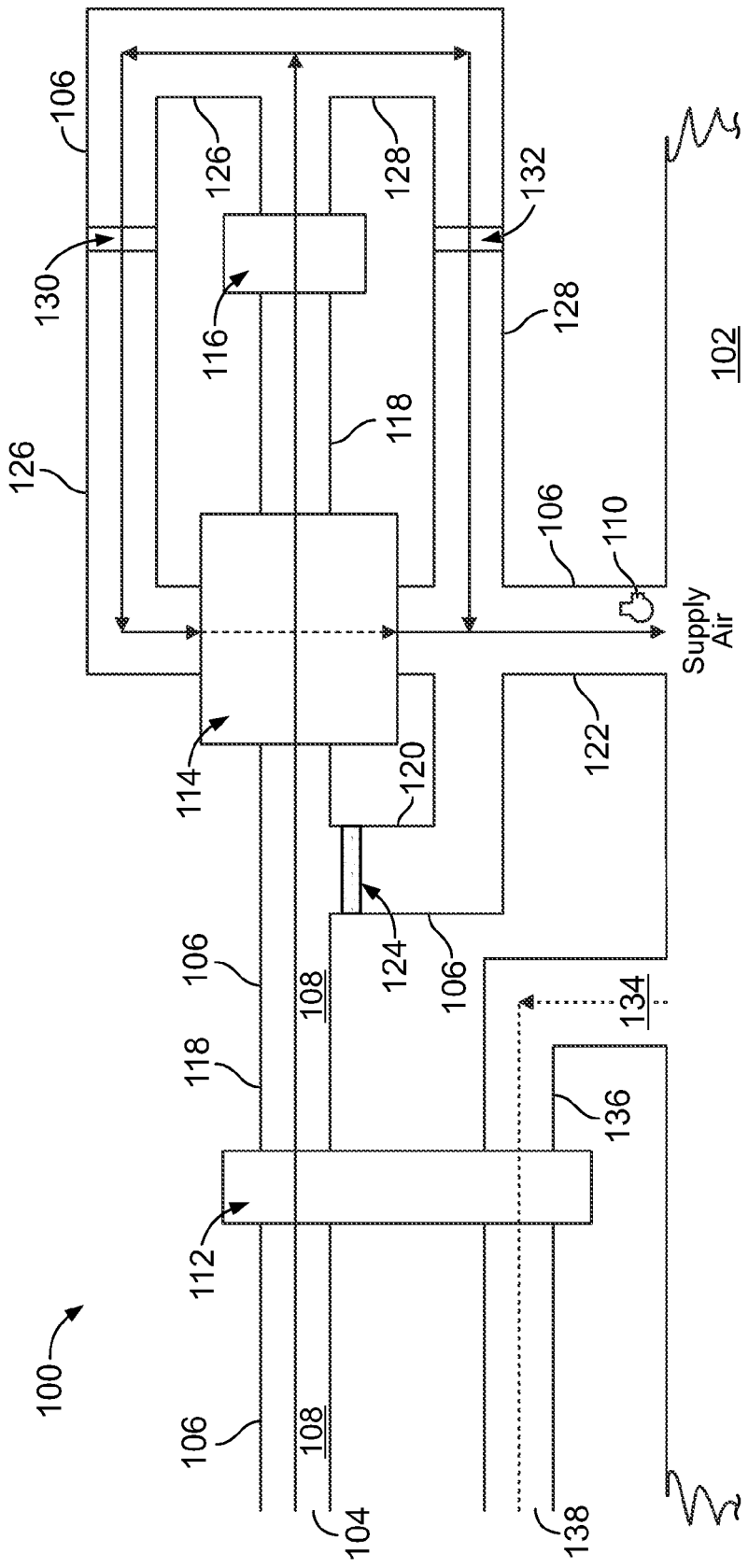
FIG. 1 illustrates a schematic view of an energy exchange system, according to an embodiment.

FIG. 1 illustrates a schematic view of an energy exchange system 100 according to an embodiment. The system 100 is configured to partly or fully condition air supplied to a structure 102, such as a building or an enclosed room. The system 100 includes an air inlet 104 fluidly connected to a supply flow path 106. The supply flow path 106 may channel air 108 (such as outside air, air from a building adjacent to the enclosed structure 102, return air from a room within the enclosed structure 102, or air from an adjacent HVAC system) to the enclosed structure 102. The air 108 in the supply flow path 106 may be moved through the supply flow path 106 by a fan or fan array 110. The illustrated embodiment shows the fan 110 located downstream of a pre-conditioning device, such as an energy recovery device 112, a sensible heat exchanger, such as a plate heat exchanger 114, and a cooling coil 116, used to pre-condition the air before the air encounters the plate heat exchanger 114. Optionally, the fan 110 may be positioned upstream of the energy recovery device 112, the plate heat exchanger 114, and/or the cooling coil 116.

The supply flow path 106 may be formed of insulated conduits, channels, ducts, or the like that allow the air 108 to pass therethrough. The supply flow path 106 includes a central sub-path 118 that extends from the air inlet 104 and through the energy recovery device 112, the plate heat exchanger 114, and the cooling coil 116. As shown, the central sub-path 118 may be a linear path. However, the central sub-path 118 may deviate from a linear path, depending on the size, shape, location, and the like of the energy exchange system 100 and/or of a building into which the central sub-path 118 is positioned.

The supply flow path 106 also includes a bypass sub-path 120 that branches off from the central sub-path 118 downstream from the energy recovery device 112, but upstream from the plate heat exchanger 114. The bypass sub-path 120 connects to a delivery sub-path 122 of the supply flow path 106. A bypass damper 124 is disposed within the bypass sub-path 120. The bypass damper 124 may be selectively opened and closed. Further, the bypass damper 124 may be oriented in any position between being fully opened and fully closed (that is, the bypass damper 124 may be partially opened and partially closed) in order to restrict the amount of air that passes therethrough. When the bypass damper 124 is opened, air 108 is allowed to pass directly from the central sub-path 118 to the delivery sub-path 122 and into the enclosed structure 102. When the bypass damper 124 is closed (as shown in FIG. 1), air 108 is unable to pass into the bypass sub-path 124. Instead, the air 108 is directed toward the plate heat exchanger 114 in the central sub-path 118.

Downstream from the cooling coil 116 within the supply flow path 106, the central sub-path 118 branches off to a re-direct sub-path 126 and a direct or pre-delivery sub-path 128. As shown, the re-direct sub-path 126 and the pre-delivery sub-path 128 extend in opposite directions from the central sub-path 118. The re-direct sub-path 126 loops back to the plate heat exchanger 114, which then connects to the delivery sub-path 122. Therefore, air 108 that has passed through the plate heat exchanger 114 and the cooling coil 116 within the central sub-path 118 may be re-directed back to the plate heat exchanger 114 for further conditioning. The pre-delivery sub-path 128 connects directly to the delivery sub-path 122. Thus, air 108 that has passed through the plate heat exchanger 114 and the cooling coil 116 may be directly delivered to the enclosed structure 102.

A re-direct damper 130 is disposed within the re-direct sub-path 126. The re-direct damper 130 may be selectively opened and closed. Further, the re-direct damper 130 may be oriented in any position between being fully opened and fully closed (that is, the re-direct damper 130 may be partially opened and partially closed) in order to restrict the amount of air that passes therethrough. When the re-direct damper 130 is opened (as shown in FIG. 1), air 108 downstream of the cooling coil 116 within the central sub-path 118 may be re-directed to the plate heat exchanger 114 for further conditioning. When the re-direct damper 130 is closed, air 108 downstream of the cooling coil 116 is prevented from being re-directed to the plate heat exchanger 114. Instead, the air 108 downstream of the cooling coil 116 is shunted to the delivery sub-path 122 by way of the pre-delivery sub-path 128.

A pre-delivery damper 132 is disposed within the pre-delivery sub-path 128. The pre-delivery damper 132 may be selectively opened and closed. Further, the pre-delivery damper 132 may be oriented in any position between being fully opened and fully closed (that is, the pre-delivery damper 132 may be partially opened and partially closed) in order to restrict the amount of air that passes therethrough. When the pre-delivery damper 132 is opened (as shown in FIG. 1), air 108 downstream from the cooling coil 116 within the central sub-path 118 may pass into the pre-delivery sub-path 128, into the delivery sub-path 122, and into the enclosed structure 102. However, when the pre-delivery damper 132 is closed, air 108 downstream of the cooling coil 116 is prevented from passing through the pre-delivery sub-path 128 into the delivery sub-path 122. Instead, the air 108 is shunted to the re-direct sub-path 126, if the re-direct damper 130 is open. As shown, the re-direct sub-path 126 and the pre-delivery sub-path 128 may be linear paths. However, both sub-paths 126 and 128 may deviate from a linear path, depending on the size, shape, location, and the like of the energy exchange system 100 and/or the building into which the sub-paths 126 and 128 are positioned.

If, however, both the re-direct damper 130 and the pre-delivery damper 132 are closed, and the bypass damper 124 is opened, air pressure within the central sub-path 118 builds so that air 108 does not pass into either the re-direct sub-path 126 or the pre-delivery sub-path 128. Instead, the air 108 simply flows from the bypass sub-path 120 into the delivery sub-path 122, and into the enclosed structure 102.

Return air 134 from the enclosed structure 102 passes into a return flow path 136. The energy recovery device 112 is also positioned within the return air flow path 136. Accordingly, return air 134 passes through the energy recovery device 112 within the return flow path 136 and is exhausted to the outside environment through an air outlet 138.

Figure 2:
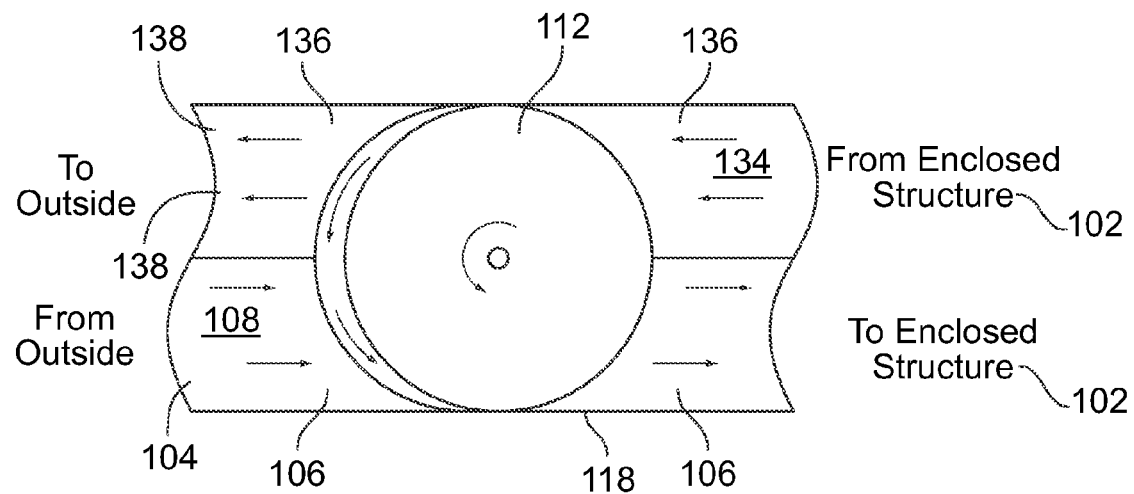
FIG. 2 illustrates a schematic view of an energy recovery device, according to an embodiment.

FIG. 2 illustrates a schematic view of the energy recovery device 112, according to an embodiment. A portion of the energy recovery device 112 is disposed within the supply flow path 106, while another portion of the energy recovery device 112 is disposed within the return flow path 136. The energy recovery device 112 is configured to transfer heat and/or moisture between the supply flow path 106 and the return flow path 136. The energy recovery device 112 may be one or more of various types of energy recovery devices, such as, for example, an enthalpy wheel, a sensible wheel, a desiccant wheel, a plate heat exchanger, a plate energy (heat and moisture) exchanger, a heat pipe, a run-around loop, a passive or active run-around membrane energy exchanger (RAMEE), a liquid-to-air membrane energy exchanger (LAMEE), or the like. As shown in FIG. 2, the energy device 112 may be an enthalpy wheel.

An enthalpy wheel is a rotary air-to-air heat exchanger. As shown, supply air 108 within the supply flow path 106 passes in a direction counter-flow to the return air 134 within return flow path 136. For example, the supply air 108 may flow through the lower half of the wheel, while the return air 134 flows through the upper half of the wheel, or vice versa. The wheel may be formed of a heat-conducting material with an optional desiccant coating.

In general, the wheel may be filled with an air permeable material resulting in a large surface area. The surface area is the medium for sensible energy transfer. As the wheel rotates between the supply and exhaust flow paths 106 and 136, respectively, the wheel picks up heat energy and releases it into the colder air stream. Enthalpy exchange may be accomplished through the use of desiccants on an outer surface of the wheel. Desiccants transfer moisture through the process of adsorption, which is driven by the difference in the partial pressure of vapor within the opposing air streams.

Additionally, the rotational speed of the wheel also changes the amount of heat and moisture transferred. A slowly-turning desiccant coated wheel primarily transfers moisture. A faster turning desiccant coated wheel provides for both heat and moisture transfer.

Optionally, the energy recovery device 112 may be a sensible wheel, a dehumidification wheel, a plate exchanger, a heat pipe, a run-around apparatus, a refrigeration loop having a condenser and evaporator, a chilled water coil, or the like.

Alternatively, the energy recovery device 112 may be a flat plate exchanger. A flat plate exchanger is generally a fixed plate that has no moving parts. The exchanger may include alternating layers of plates that are separated and sealed. Because the plates are generally solid and non-permeable, only sensible energy is transferred. Optionally, the plates may be made from a selectively permeable material that allows for both sensible and latent energy transfer.

Also, the energy recovery device 112 may be a heat exchanger, such as shown and described in U.S. application Ser. No. 12/910,464 entitled "Heat Exchanger for an Equipment Rack," filed Oct. 22, 2010, which is hereby incorporated by reference in its entirety.

Alternatively, the energy recovery device 112 may be a run-around loop or coil. A run-around loop or coil includes two or more multi-row finned tube coils connected to each other by a pumped pipework circuit. The pipework is charged with a heat exchange fluid, typically water or glycol, which picks up heat from the exhaust air coil and transfers the heat to the supply air coil before returning again. Thus, heat from an exhaust air stream is transferred through the pipework coil to the circulating fluid, and then from the fluid through the pipework coil to the supply air stream.

Also, alternatively, the energy recovery device 112 may be a heat pipe. A heat pipe is a thermal transfer device that includes one or more sealed pipes or tubes made of a material with a high thermal conductivity such as copper or aluminum at both hot and cold ends. A vacuum pump is used to remove all air from the empty heat pipe, and then the pipe is filled with a fraction of a percent by volume of a vaporizable liquid or refrigerant, such as water, ethanol, HCFC, R134a, R-22, R407c, R410a, etc. Heat pipes contain no mechanical moving parts. Heat pipes employ transfer thermal energy from one point to another by the evaporation and condensation of a working fluid, vaporizable liquid, or coolant.

Referring again, to FIG. 1, as outdoor air 108 enters the supply flow path 106 through the inlet 104, the unconditioned air 108 encounters the energy recovery device 112, which may be an enthalpy wheel, flat plate exchanger, heat pipe, run-around, or the like, as discussed above. If the air is hot and humid (such as during the summer), one or both of the temperature and humidity of the supply air is lowered by the energy recovery device 112. Sensible and/or latent energy from the supply air is transferred to the energy recovery device 112, thereby lowering the temperature and/or humidity of the supply air.

If, however, the supply air 108 is cold and dry (such as during the winter), the temperature and/or humidity of the supply air 108 will be raised as it encounters the energy recovery device 112. As such, in winter conditions, the energy recovery device 112 warms and/or humidifies the supply air 108.

A similar process occurs as the return air 134 encounters the energy recovery device 112 in the return flow path 136. The sensible and/or latent energy transferred to the energy recovery device 112 in the return flow path 136 is then used to pre-condition the air within the supply flow path 106.

After the supply air 108 within the central sub-path 118 passes through the energy recovery device 112, the air 108 passes by the bypass sub-path 120. As shown in FIG. 1, the bypass damper 124 is closed, thereby preventing the supply air 108 from passing into the bypass sub-path 120. However, when the bypass damper 124 is opened, supply air 108 may pass directly from the central sub-path 108, into the bypass sub-path 120, and into the enclosed space 102 by way of the delivery sub-path 122, thereby bypassing the plate heat exchanger 114. When air flows through the bypass damper 124 and into the bypass sub-path 120 and the enclosed space (while bypassing the plate heat exchanger 114, and the cooling coil 116), the bypassed air significantly reduces the air pressure drop and enables the system 100 to reduce overall power consumed by the fan 110.

Figure 3:
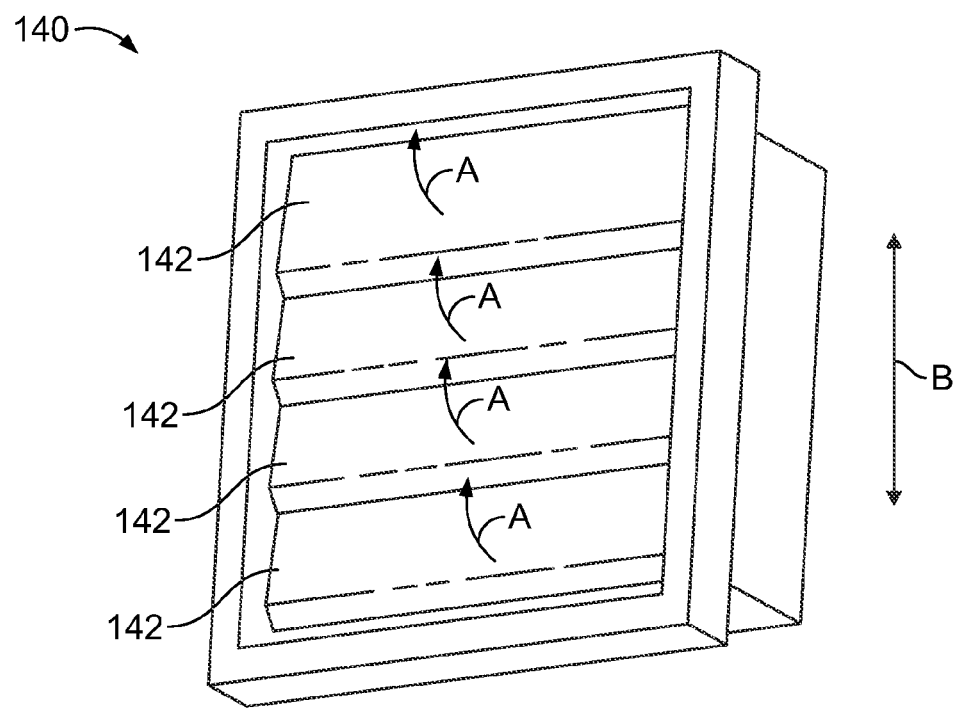
FIG. 3 illustrates a perspective view of a damper, according to an embodiment.

FIG. 3 illustrates a perspective view of a damper 140, according to an embodiment. Each of the bypass damper 124, the re-direct damper 130, and the pre-deliver damper 132 shown in FIG. 1 may be formed as the damper 140. The damper 140 includes a plurality of plates 142. Each plate 142 is positioned on a pivot (not shown) that allows the plates 142 to be moved between open and closed positions. As shown in FIG. 3, the plates 142 are in the fully-closed position. When the damper 140 is to be opened, the plates 142 swing open in the direction of arc A.

Alternatively, the damper 140 may include a single sliding plate that slides between open and closed positions in directions denoted by arrow B. Indeed, the damper 140 may take any form that allows selective movement between open and closed positions.

Referring again to FIG. 1, each of the dampers 124, 130, and 132 may be operatively connected to a control unit, such as a thermostat, humidistat, electronic controller, or the like. The dampers 124, 130, and 132 may be operatively connected to a computer control system that allows an operator to selectively open and close the dampers 124, 130, and 132. Thus, as shown in FIG. 1, an operator may close the bypass damper 124, while opening the re-direct and pre-delivery dampers 130 and 132, respectively. As noted above, when the bypass damper 124 is closed, the supply air 108 passes through the plate heat exchanger 114.

Figure 4:
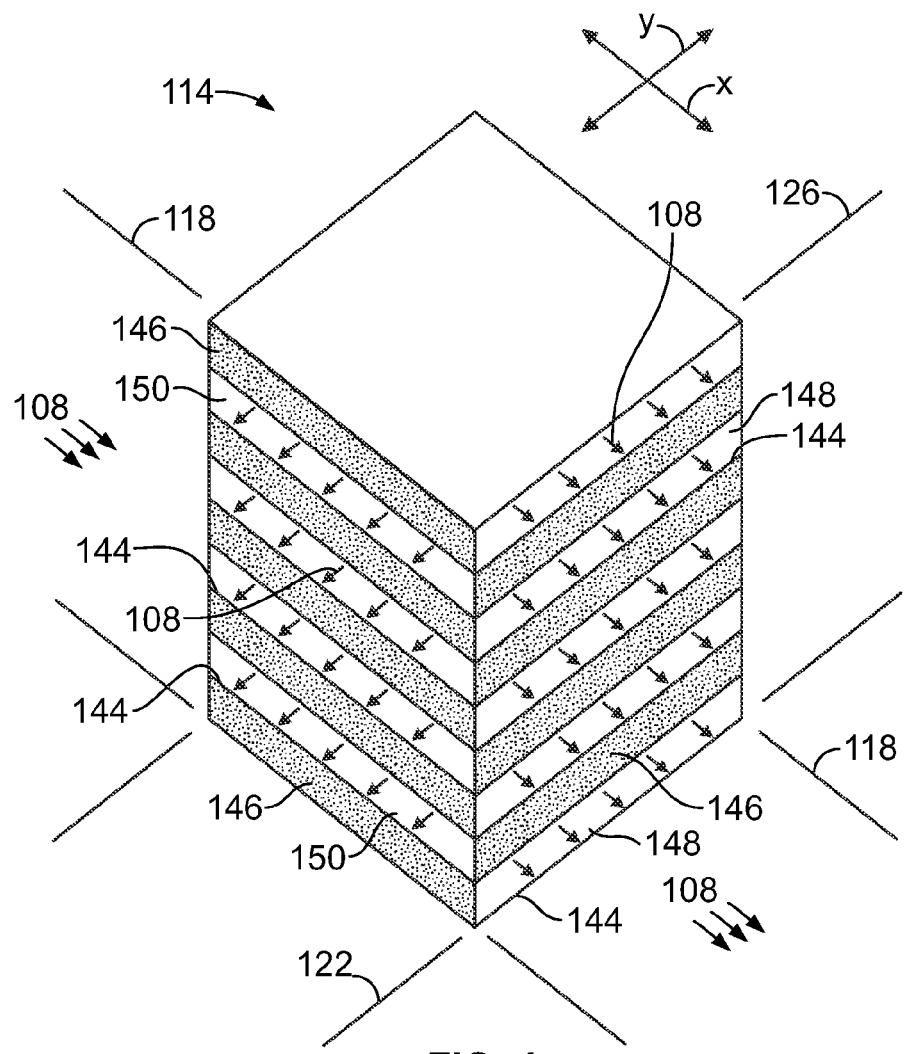
FIG. 4 illustrates a simplified perspective view of a plate heat exchanger, according to an embodiment.

FIG. 4 illustrates a simplified perspective view of the plate heat exchanger 114, according to an embodiment. The plate heat exchanger 114 includes a plurality of parallel plates 144, which may be formed of aluminum or polyester, for example. The plates 144 are integrally connected with side walls 146. As shown, the side walls 146 alternate between levels 148 and 150. The levels 148 are oriented parallel with an axis x, while the levels 150 are oriented parallel with an axis y, which is perpendicular to the axis x. Thus, levels 148 are oriented to receive and direct supply air 108 within the central sub-path 118, while the levels 150 are oriented to receive and supply air 108 from the re-direct sub-path 126 and direct it to the delivery sub-path 122. Therefore, air passing in the levels 148 cross-flows with the air in the levels 150. In this manner, sensible energy is exchanged between levels 148 and 150. During a summer mode of operation, for example, warm air within central sub-path 118 passes into the levels 148. The temperature of the warm air within the levels 148 is cooled by the cooler air cross-flowing through the levels 150. Therefore, the temperature of the air within the levels 148 and 150 tends to equilibrate with one another. That is, the warm air within the levels 148 is cooled by heat exchange with the cooler air in the levels 150, and the cooler air within the levels 150 is warmed by the warmer air within the levels 148. Air that passes into the levels 148 is cooler after passing through the plate heat exchanger 114. Conversely, air that passes into the levels 150 is warmer after passing through the plate heat exchanger 114.

Figure 5:
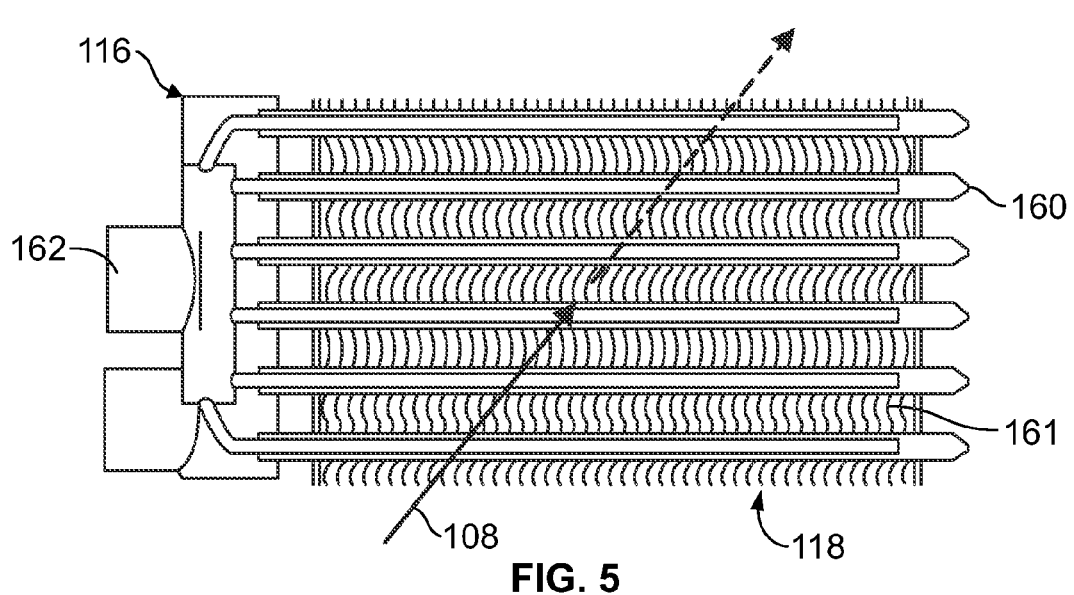
FIG. 5 illustrates a simplified perspective view of a cooling coil, according to an embodiment.

FIG. 5 illustrates a simplified perspective view of the cooling coil 116, according to an embodiment. The cooling coil 116 may include a series of seamless tubes 160, and a series of fins 161, such as formed of copper, aluminum, or the like. The tubes 160 are configured to contain a coolant, such as chilled water, glycol, refrigerant, or the like, that is circulated through the tubes 160, such as through the use of a circulation pump or compressor (not shown in FIG. 5). The tubes 160 and the fins 161 pass through a portion of the central sub-path 118. Thus, as supply air 108 passes through the cooling coil 116 within the central sub-path 118, the temperature of the air is decreased through heat exchange. As the supply air 108 reaches the saturation point (dew point temperature), further cooling through the cooling coils 116 removes moisture from the supply air 108, thereby further cooling and drying the supply air 108. A separate refrigerating unit may be operatively connected to the tubes 160 in order to continually cool the coolant therein.

Referring again to FIG. 1, in a summer mode of operation, warm and humid outside air passes into the supply flow path 106 by way of the air inlet 104. The air 108 passes into the central sub-path 118 and encounters the energy recovery device 112, which cools the air 108 and reduces its humidity. The cooler, drier air 108 then passes to the plate heat exchanger 114 (as the bypass damper 124 is closed). The plate heat exchanger 114 further cools the air 108, which then passes to the cooling coil 116, which cools and dries the air even more. The supply air 108 may also be dehumidified by the plate heat exchanger 114 if the supply air 108 reaches the saturation point (dew point temperature) while being cooled by the plate heat exchanger 114. Once the air 108 passes out of the cooling coil 116, a portion of the air 108 passes into the pre-delivery sub-path 128 (as the pre-delivery damper 132 is opened), while another portion of the air 108 passes into the re-direct sub-path 126 (as the re-direct damper 130 is opened). The cool air 108 within the pre-delivery sub-path 128 is then directed to the enclosed space 102, by way of the delivery sub-path 122. The cool air 108 within the re-direct sub-path 126 passes into the plate exchanger 114 and cools air within the central sub-path 118 that cross-flows into the plate exchanger 114. In this manner, the cool air 108 that passes into the plate heat exchanger 114 from the re-direct sub-path 126 is warmed before it passes into the enclosed space 102 by way of the delivery sub-path 122.

If the bypass damper 124 and the pre-delivery damper 132 are closed, while the re-direct damper 130 is opened, cool dry air that passes directly out of the cooling coil 116 is shunted to the re-direct sub-path 126, as opposed to directly passing to the delivery sub-path 122 by way of the pre-delivery sub-path 128. Such a configuration provides warm, dry air (neutral air conditions) to the enclosed space 102 that is warmer than if the pre-delivery damper 132 was open.

If the bypass damper 124 and the re-direct damper 130 are closed, while the pre-delivery damper 132 is opened, cool dry air that passes directly out of the cooling coil 116 is shunted to the pre-delivery sub-path 128 and the delivery sub-path 122, as opposed to passing to the re-direct sub-path 126. Such a configuration provides cooler, dry air to the enclosed space 102 that would off-set additional sensible loads in the enclosed space 102. In this embodiment the supply air 108 would be colder than if the re-direct damper 130 was open.

If the bypass damper 124 is closed and both the re-direct damper 130 and the pre-delivery damper 132 are partially opened, very dry and cool air that passes directly out of the cooling coil 116 is shunted to the pre-delivery sub-path 128 and the re-direct sub-path 126 and both air streams are mixed at the delivery sub-path 122. Such a configuration provides, very dry and cool air to the enclosed space 102 that would off-set both additional latent and sensible loads in the enclosed space 102.

If, however, an operator prefers warmer (having increased humidity) air within the enclosed space, the bypass damper 124 may be opened so that air downstream of the energy recovery device 112, but upstream of the plate heat exchanger 114, within the central sub-path 118 is shunted to delivery sub-path 122 by way of the bypass sub-path 120. If even warmer, more humid air is desired, the re-direct and pre-delivery dampers 130 and 132, respectively, may be closed, thereby forcing the air directly from the energy recovery device 112 into the bypass sub-path 120 and into the enclosed space 102 by way of the bypass sub-path 120.

If, however, the air downstream of the energy recovery device 112 is favorable to condition and or dehumidify the enclosed space 102 (because the outside air and ambient conditions are cool and or dry, for instance), the bypass damper 124 may be opened so that air downstream of the energy recovery device 112, but upstream of the plate heat exchanger 114, within the central sub-path 118 is shunted to delivery sub-path 122 by way of the bypass sub-path 120. The re-direct and pre-delivery dampers 130 and 132, respectively, may be closed, thereby forcing the air directly from the energy recovery device 112 into the bypass sub-path 120 and into the enclosed space 102 by way of the bypass sub-path 120. This embodiment significantly reduces the air pressure drop and enables the system 100 to reduce overall power consumed by the fan 110. Further, power demands and/or requirements of the chiller plants, compressors and pumps to produce and circulate the coolant may be reduced and or eliminated.

The system 100 may be operated in various configurations. The operator may selectively open and close the dampers 124, 130, and 132 to provide air to the enclosed space 102 having a desired temperature and humidity. However, as shown in FIG. 1, the bypass damper 124 is closed, while the re-direct and pre-delivery dampers 130 and 132, respectively, are open. As shown in FIG. 1, during a summer mode of operation, with the bypass damper 124 closed, the plate heat exchanger 114 provides pre-sensible cooling and sensible re-heat to the air 108 when there is a demand for cooler, drier air within the enclosed space 102. Both the re-direct and pre-delivery dampers 130 and 132 may be modulated from fully open to fully closed positions to provide cooler, warmer, drier air, and offset any varying sensible and latent loads in the enclosed space 102.

Optionally, a sensible wheel or heat pipe may be used in place of the plate heat exchanger 114.

Figure 6:
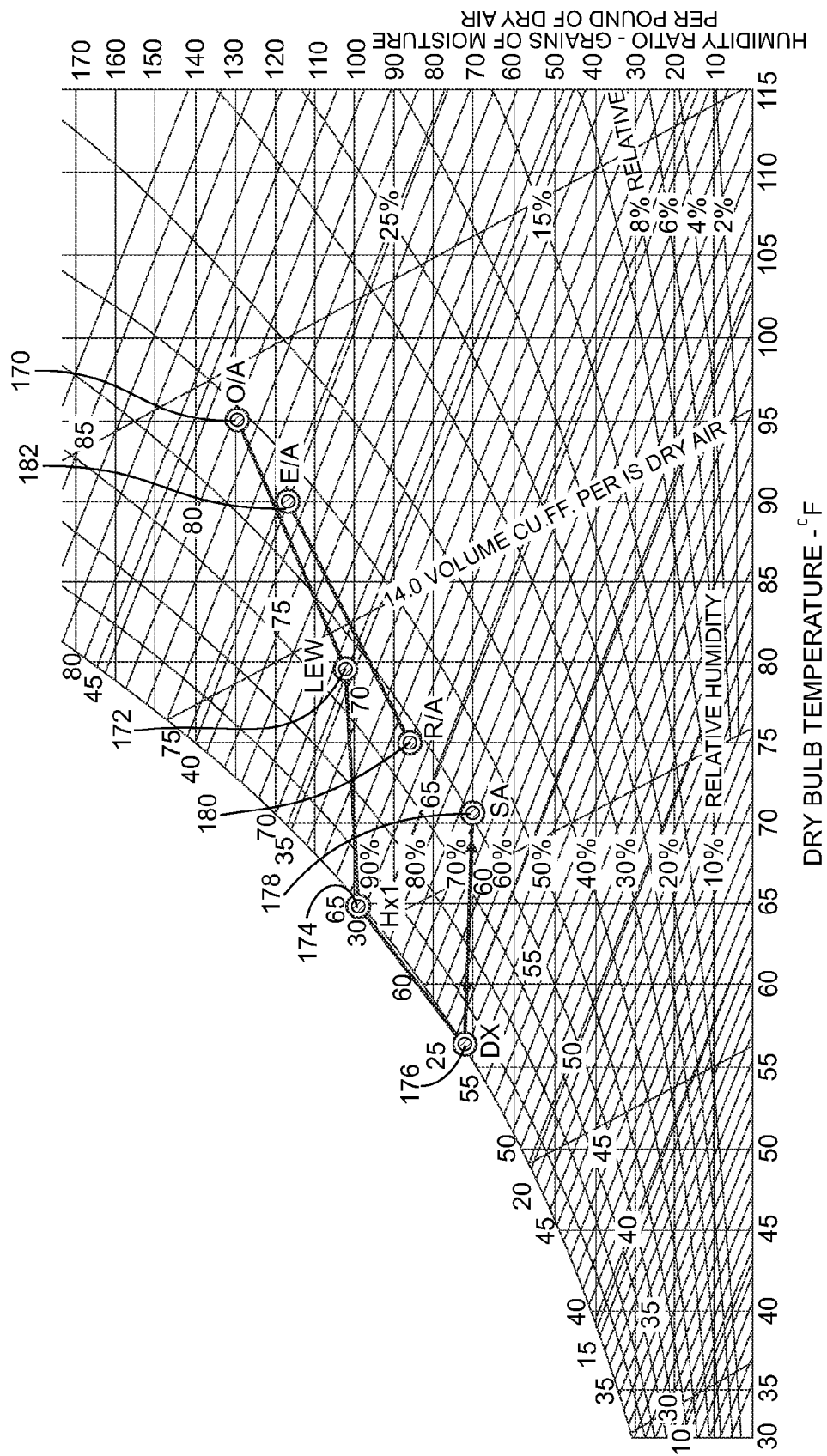
FIG. 6 illustrates a psychrometric chart of an energy exchange system, according to an embodiment.

FIG. 6 illustrates a psychrometric chart of the energy exchange system 100 (shown in FIG. 1), according to an embodiment. The psychrometric chart is associated with the system 100 as shown in FIG. 1, with the bypass damper 124 closed, and the re-direct and pre-delivery dampers 130 and 132, respectively, open.

Referring to FIGS. 1 and 6, outside air 170 enters the supply flow path 104 having a dry bulb temperature of 95° F. and a humidity ratio of 130 grains of moisture per pound of dry air. The air 170 then passes into the energy recovery device 112 within the central sub-path 118. The energy recovery device 112 lowers the temperature and humidity of the outside air 170 yielding air 172 having a reduced temperature and humidity as it passes out of the energy recovery device 112. As shown in the chart, the dry bulb temperature of the air 172 may be reduced to approximately 78° F., while the humidity ratio may be lowered to approximately 90 grains.

The plate heat exchanger 114 then reduces the sensible energy of the air 172. In particular, as the air 174 passes out of the plate heat exchanger 114 within the central sub-path 118, the dry bulb temperature of the air 174 is approximately 65° F., while its humidity ratio remains at 90 grains. After passing through the plate heat exchanger 114 within the central sub-path 118, the air 174 then encounters the cooling coil 116. The cooling coil 116 cools the air 174 even further and reduces its humidity ratio further. The air leaving the cooling coil 116 is sufficiently dried to offset latent loads in the enclosed space 102. As shown in FIG. 6, the air 176 after passing through the cooling coil 116 has a dry bulb temperature of approximately 56° F. and a humidity ratio of approximately 70 grains. In order to avoid over-cooling the enclosed space 102 when latent-only load control is used, the air 176 is warmed by re-directing all of the air back through the plate heat exchanger 114. By warming the air 176, over-cooling the enclosed space 102 is avoided. All of the air 176 is branched off to the re-direct sub-path 126 to the plate heat exchanger 114, which re-heats the air (due to the warmer air within the central sub-path 118 cross-flowing through the plate heat exchanger 114. Accordingly, the dry bulb temperature of the air 178 supplied to the enclosed space 102 is increased to approximately 72° F., while the humidity ratio of the air 178 remains at approximately 70 grains, thereby yielding neutral air to the enclosed space 102.

Alternatively if both latent and sensible load control are desired, the air 176 is not reheated, such as by re-directing all the air to the pre-delivery sub-path 128. By not reheating the air 176, the additional sensible heat in the enclosed space 102 is off-set and can be satisfied. All the air 176 is branched off to the pre-delivery sub-path 128, into the delivery sub-path 122, and into the enclosed structure 102, which does not reheat the air. Accordingly, the dry bulb temperature of the air 178 supplied to the enclosed space 102 is approximately 56° F., while the humidity ratio of the air 178 remains at approximately 70 grains, thereby yielding cool dry air to the enclosed space 102. Alternatively, if latent and partial sensible load control is desired, the air 176 is partially branched off to the re-direct sub-path 126 and to the pre-delivery sub-path 128. The air streams are then mixed together in the delivery sub-path 122, prior to entering the enclosed structure 102. Accordingly, the dry bulb temperature of the air 178 supplied to the enclosed space 102, may be between 57° F. and 69° F., for example, while the humidity ratio of the air 178 remains at approximately 70 grains, thereby yielding tempered dried air to the enclosed space 102.

During the process explained above, return air 180 within the enclosed space 102 has a dry bulb temperature of approximately 75° and a humidity ratio of approximately 78 grains. As the return air 180 passes through the energy recovery device 112, the temperature and humidity of the return air 180 is increased. After passing through the energy recovery device 112 in the return flow path 136, the air 182 is exhausted back to the atmosphere having a dry bulb temperature of approximately 92° F. and a humidity ratio of approximately 115 grains. The temperatures and humidity ratio noted above are merely examples.

If an operator desires to maintain the humidity within the supply air after the air passes through the energy recovery device 112, the operator would open the bypass damper 124 and close the pre-delivery and re-direct dampers 132 and 130, respectively. In this manner, the air would be shunted from the central sub-path 108 directly to the delivery sub-path 122 by way of the bypass sub-path 120, but would not pass through the cooling coil 116. Additionally, operating the system 100 so that the dampers 130 and 132 are closed, while the bypass damper 124 is opened enables the system 100 to reduce overall power consumed by the fan 110, as the plate heat exchanger 114 and the cooling coil 116 are bypassed. The bypass configuration in which the bypass damper 124 is opened, while the other dampers 130 and 132 are closed may be used during a winter mode operation in which the outside air is heated and humidified through the energy recovery device 112.

Figure 7:
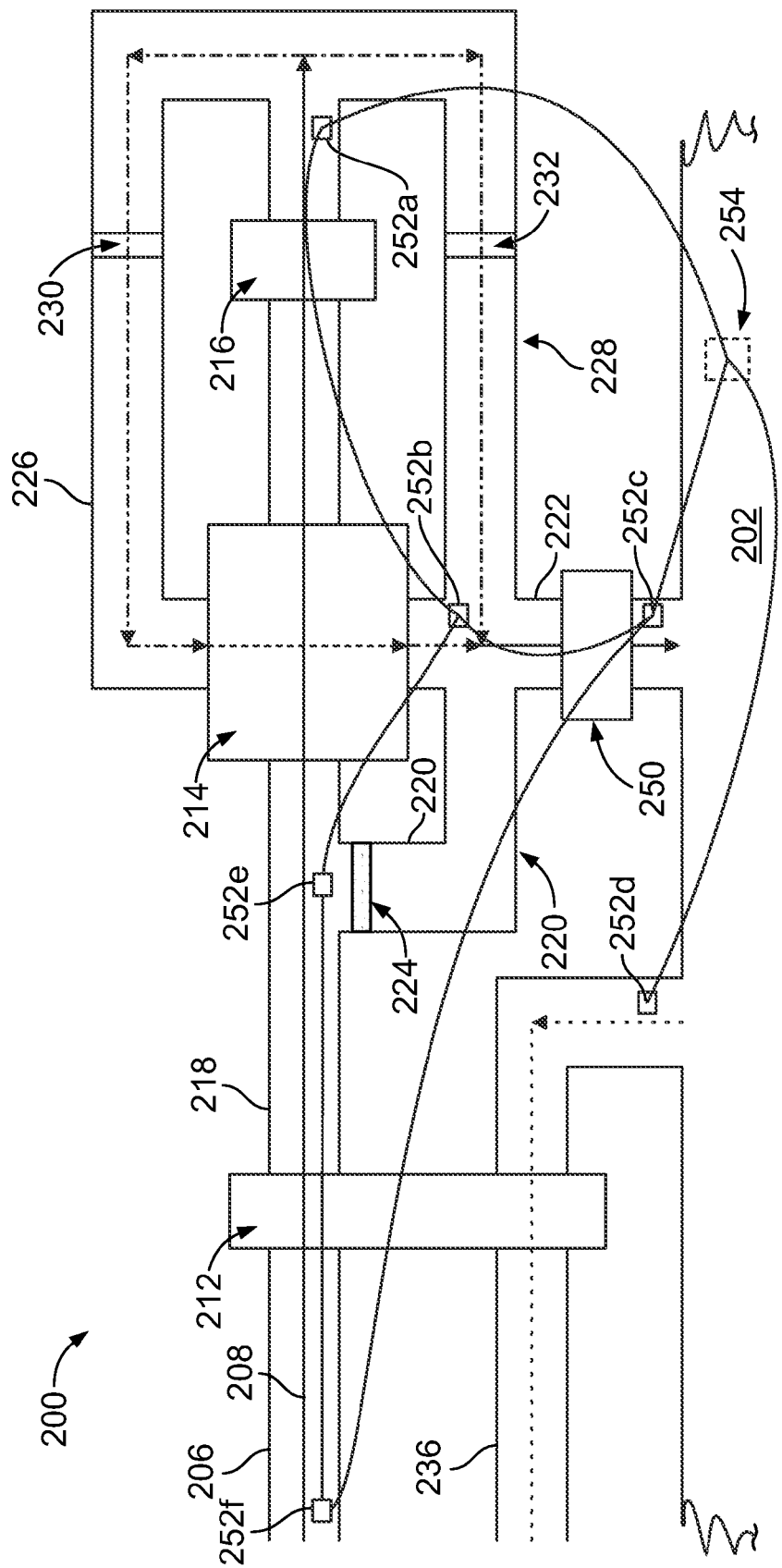
FIG. 7 illustrates a schematic view of an energy exchange system, according to an embodiment.

FIG. 7 illustrates a schematic view of an energy exchange system 200, according to an embodiment. The system 200 is similar to the system 100 shown in FIG. 1. For example, the system 200 includes an energy recovery device 212 disposed in a supply flow path 206 that channels the supply air 208, and a return flow path 236. A plate heat exchanger 214 and a cooling coil 216 are disposed within a central sub-path 218 of the supply flow path 206 downstream from the energy recovery device 212. A distal end of the central sub-path 218 branches off into a re-direct sub-path 226 and a pre-delivery sub-path 228. A bypass damper 224 is disposed within a bypass sub-path 220. A re-direct damper 230 is disposed within the re-direct sub-path 226, and a pre-delivery damper 232 is disposed within the pre-delivery sub-path 228.

However, a heating element 250 may be disposed within a delivery sub-path 222 downstream from the plate heat exchanger 214. The heating element 250 may be any device configured to heat the air. For example, the heating element 250 may be a heating coil circulating hot water, steam coils, an electric heater, a gas burner, refrigerant reheat, refrigerant sub-cooling or desuperheating coil, or the like. Further, temperature and humidity sensors 252a, 252b, 252c, 252d, 252e, and 252f, such as digital thermometers, humidity detectors, and the like, may be located throughout the system 200. For example, the sensor 252a may be disposed within the central sub-path 218 downstream from the cooling coil 216. The sensor 252b may be disposed within the delivery sub-path 222 downstream from the plate heat exchanger 214 and upstream from the heating element 250. The sensor 252c may be disposed within the delivery sub-path 222 downstream from the heating element 250. The sensor 252d may be disposed within the return flow path 236 upstream from the energy recovery device 212. The sensor 252e may be disposed within the central sub-path 218 downstream from the energy recover device 212. The sensor 252f may be disposed within the central sub-path 218 upstream from the energy recovery device 212.

The sensors 252a, 252b, 252c, 252d, 252e, and 252f may be electrically connected to a remote control unit 254, such as a combination thermo-humidistat, computer, or the like, which monitors the sensors 252a, 252b, 252c, 252d, 252e, and 252f. The control unit 254 monitors the temperature and humidity of the air within the system 200 at various points in order to provide information to an operator. Optionally, the control unit 254 may automatically operate the system 200, based on input temperature and humidity parameters, in conjunction with detected temperature and humidity readings throughout the system 200 and the enclosed space 202. More or less sensors than those shown may be used.

The control unit 254 may be operatively connected to the dampers 224, 230, and 232 in order to selectively open and close the dampers 224, 230, and 232 based on temperature and humidity set-points and actual detected temperatures and humidity within the system 200 and/or the enclosed space 202. Additionally, the control unit 254 may be operatively connected to the energy recovery device 212, such as an enthalpy wheel. The control unit 254 may control the rotational speed of an enthalpy wheel, for example, to control the temperature and humidity level of supply air as it passes through the enthalpy wheel within the central sub-path 218. As noted above, the rotational speed of the wheel changes the amount of heat and moisture transferred. A slowly-turning desiccant coated wheel primarily transfers moisture. A faster turning desiccant coated wheel provides for both heat and moisture transfer.

The heating element 250 may be used to heat the air (if over-cooled) within the delivery sub-path 222 after the air passes through the plate heat exchanger 214. The heating element 250 may be configured similar to the cooling coil 216, but may contain circulated heated liquid within the coil. Alternatively, as noted above, the heating element 250 may be an electric heater, gas burner, refrigerant reheat coil, refrigerator sub-cooling or desuperheating coil, or the like. Therefore, as cool air passes through the heating element 250, the cool air is warmed through heat exchange with the heating element 250. Optionally, the heating element 250 may also transfer latent energy between the air and the circulated liquid within the heating element 250 such as a passive or active run-around membrane energy exchanger (RAMEE) or a liquid-to-air membrane energy exchanger (LAMEE). Alternatively, the heating element 250 may be another cooling coil configured to cool and/or dehumidify the air even further. During a summer mode of operation, the heating element 250 may be deactivated, depending on the latent and sensible load requirements of the enclosed space 202.

As shown in FIG. 7, the bypass damper 224 is closed, while the re-direct and pre-delivery dampers 230 and 232, respectively, are opened, similar to the configuration shown in FIG. 1. During a summer mode of operation, outside air passes into the supply flow path 206 and encounters the energy recovery device 212, which lowers the temperature and humidity of the air. The air then passes through the plate heat exchanger 214, which reduces the temperature of the air, which is then passed onto the cooling coil 216. The air may also be dehumidified by the plate heat exchanger 214 if the air reaches the saturation point (dew point temperature) while being cooled by the plate heat exchanger 214. The cooling coil 216 then reduces the temperature and humidity of the air, and the air passes out of the cooling coil 216 with a portion of the air passing into the pre-delivery sub-path 228 and another portion of the air passing into the re-direct sub-path 226. The re-directed cooled air within the re-direct sub-path 226 passes through the plate heat exchanger 214 and exchanges sensible energy with the air cross-flowing through the plate heat exchanger 214 in the central sub-path 218. The re-directed air within the re-direct sub-path 226 is then warmed in the plate heat exchanger 214 and passed into the delivery sub-path 222, where it combines with the portion of the air that passes into the pre-delivery sub-path 228. The combined air then passes through the heating element 250, which may heat the combined air before the air passes into the enclosed space 202.

Figure 8:
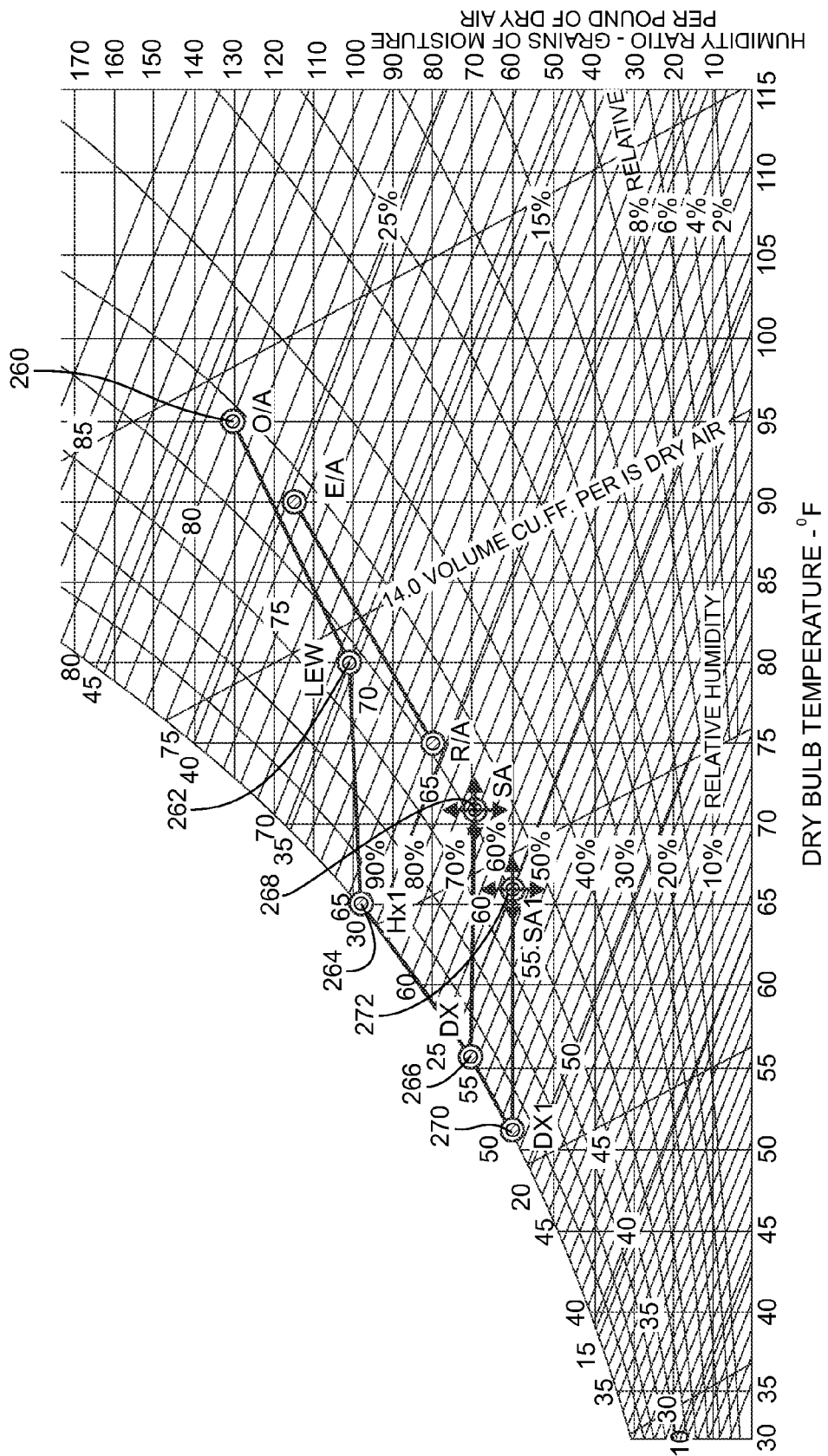
FIG. 8 illustrates a psychrometric chart of an energy exchange system, according to an embodiment.

FIG. 8 illustrates a psychrometric chart of the energy system 200, according to an embodiment. The psychrometric chart of the energy system 200 is associated with the configuration shown in FIG. 7. Referring to FIGS. 7 and 8, outside air 260 enters the supply flow path 206 having a dry bulb temperature of approximately 95° F. and a humidity ratio of 130 grains of moisture per pound of dry air. The air then passes through the energy recovery device 212. After passing through the energy recovery device 212, the air 262 has a dry bulb temperature of approximately 78° F. and a humidity ratio of approximately 90 grains. The air then passes into the plate heat exchanger 214. The plate heat exchanger 214 lowers the temperature of the air 264 to approximately 65° F. while the humidity ratio is maintained at approximately 90 grains. The air is then passed to the cooling coil 216. The cooling coil 216 lowers the dry bulb temperature of the air 266 to approximately 56° F., while also dropping the humidity ratio to approximately 70 grains. The re-directed and pre-delivered air combine within the delivery sub-path 222. The heating element 250 may be selectively operated to adjust the dry bulb temperature and humidity ratio of the combined air 268 based on desired settings. For example, the control unit 254 may monitor the temperature and humidity of the air within the system 200 through the sensors 252a-f. Based on these readings, the control unit 254 may selectively operate the heating element 250 in order to further heat, cool, humidify, or dehumidify the air 268. In an embodiment, the control unit 254 may operate the coil 250 so that the retained liquid within the coil 250 is cooled, heated, and/or moisture contained therein is increased or decreased.

With both re-direct and pre-delivery dampers 230 and 232 open and modulated between their fully open and fully closed positions, the system 200 is able to modulate the pre-cooling and re-heating effect of the plate heat exchanger 214 based on satisfaction of the varying enclosed space conditions. As such, the control unit 254 may be operated to improve and increase the overall efficiency of the system. That is, the control unit 254 may operate the system 200 to respond to temperature and humidity variations independently. For example, if the control unit 254 detects, through the sensor 252c, that the air being supplied to the enclosed space is too cool and/or too dry, the control unit 254 may act to open the bypass damper 224 and close the dampers 230 and 232. If the control unit 254 determines that the air supplied to the enclosed space 202 is too warm, the control unit 254 may deactivate the heating element 250, for example, and/or close the damper 230 so that the all of the air downstream from the cooling coil 216 within the central sub-path 218 is shunted to the delivery sub-path 222 by way of the pre-delivery sub-path 228.

If, however, the air being supplied to the enclosed space 202 is too cool, the pre-delivery damper 232 may be closed, while the re-direct damper 230 is opened. In this scenario, the bypass damper 224 may be closed or opened, depending on the desired temperature and humidity level within the enclosed space 202. The heating element 250 may provide supplemental auxiliary heat to the air within the delivery sub-path 222 when the ambient air temperature and plate heat exchanger 214 are unable to provide enough reheating energy by themselves. For example, in low dew point applications or when the enclosed space latent loads are very high, air exiting the cooling coil 216 may be lower than 55°

F., as illustrated in FIG. 8, where the cooling coil 216 lowers the dry bulb temperature of the air 270 to approximately 50° F., while also dropping the humidity ratio to approximately 56 grains. Accordingly, there may be insufficient reheat available in the plate heat exchanger 214 to discharge supply air at neutral conditions (for example, 70° F.), even with the pre-delivery damper 232 fully closed and re-direct damper 230 fully opened. Thus, the heating element 250 may be activated to provide additional post-heating to the supply air. As another example, when ambient air conditions are such that the dry bulb temperature is lower (for example, the supply air 208 prior to the plate heat exchanger 214 is at 70° F. dry bulb temperature), there may be insufficient reheat available in the plate heat exchanger 214 (when air exiting the cooling coil 216 is around 55° F.) to discharge supply air at neutral conditions (for example, 70° F.), even with the pre-delivery damper 232 fully closed and the re-direct damper 230 fully opened. Thus, the heating element 250 may be activated to provide additional post-heating to the supply air.

Figure 9:
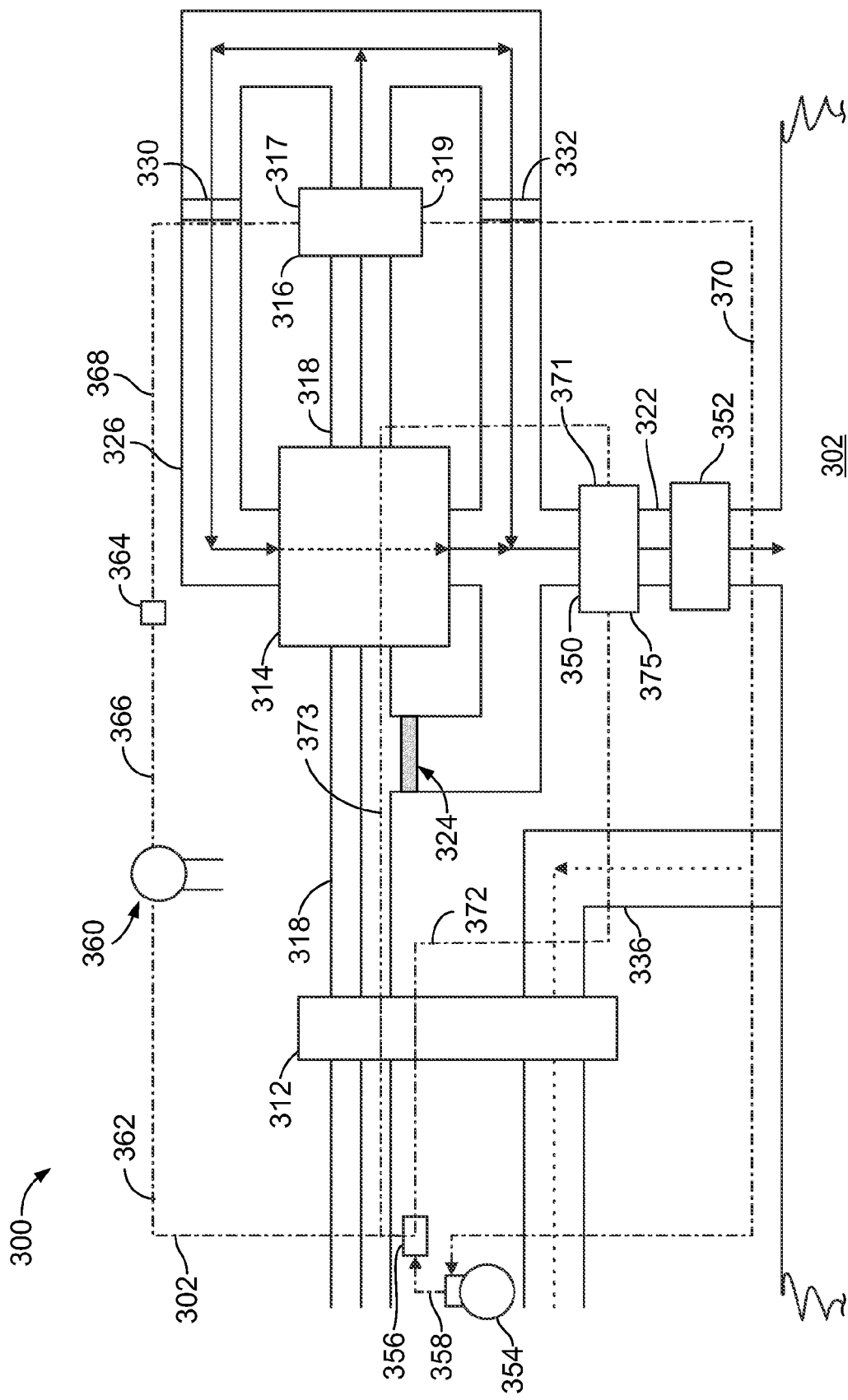
FIG. 9 illustrates a schematic view of an energy exchange system, according to an embodiment.

FIG. 9 illustrates a schematic view of an energy exchange system, according to an embodiment. The system 300 is similar to the systems 100 and 200 shown in and described above. However, the system 300 includes a fluid circulation circuit 302 in communication with the cooling coil 316 and a heating coil 350 disposed within the delivery sub-path 322 downstream from the plate heat exchanger 314, but upstream from a heating coil 352.

The fluid circulation circuit 302 includes a compressor or coolant pump 354 connected to a refrigerant flow control device 356 through a conduit 358. The flow control device 356 may then connect to a heat exchanger 360 through a conduit 362. A metering device 364 is, in turn, connected to the second heat exchanger 360 through a conduit 366. The metering device 364 is also connected to an inlet end 317 of the cooling coil 316 through a conduit 368. An outlet end 319 of the cooling coil 316 is then connected back to the compressor or coolant pump 354 through a conduit 370. An inlet end 375 of the heating coil 350 connects to the flow control device 356 through the conduit 372. An outlet end 371 of the heating coil 350 is connected to branching conduit 373.

In operation, the compressor or coolant pump 354 circulates refrigerant, coolant, or the like, such as chilled water, glycol, R410a, R134a refrigerants, or the like to and from the cooling coil 316 and the heating coil 350. The flow control device 356 is used to control the flow of coolant through the heating coil 350. Coolant is circulated through fluid circulation circuit 302 and the conduits, and the heat exchanger 360 is used to transfer heat absorbed by the coolant to a heat rejection loop. The coolant is passed to the cooling coil 316 and the heating coil 350 to provide additional heating to the air within the central sub-path 318 and provide additional heating to the air within the delivery sub-path 322. After the coolant passes through the cooling coil 316 and the heating coil 350, the coolant is recirculated back to the compressor or pump 354 and the heat exchanger 360.

Additionally, a refrigerant switching device may be disposed within the fluid circulation circuit 302 at a point that branches off to a supply line to the cooling coil 316 and a separate supply line to the heating coil 350. The switching device may be operated to provide coolant to the cooling coil 316 and the heating coil 350. Optionally, both the coils 316 and 350 may be operated as cooling coils. Optionally, the switching device may be used to reverse the flow of coolant within the fluid circulation circuit 302 so that the fluid circulation circuit acts as reverse heat pump. That is, during a winter mode of operation, the switching device may be used to switch the cooling coil 316 to a heating coil.

Therefore, during a winter mode, the plate heat exchanger 314 may be switched from a pre-cool and re-heat configuration, as in the summer mode, to a pre-heat and re-cool configuration. The pre-heat and re-cool configuration may be used to offset the operating conditions of a refrigerant heating system, in order to provide operation throughout the entire year, thereby improving the heat pump coefficient of performance (COP) by increasing the input temperature at coil 316, for instance, and reducing or eliminating the need for any auxiliary pre-heating devices.

Figure 10:
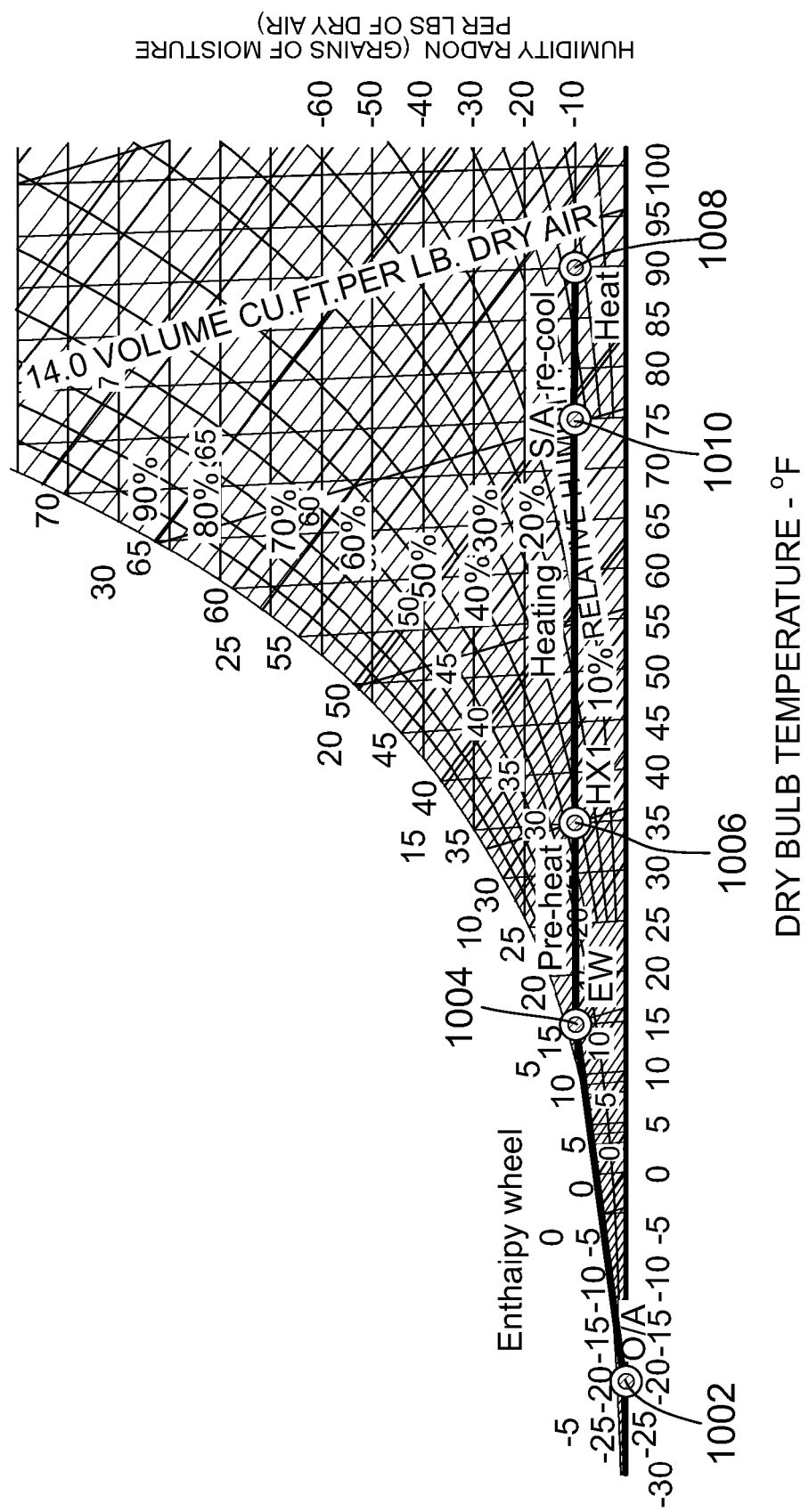
FIG. 10 illustrates a psychrometric chart of an energy exchange system, according to an embodiment.

FIG. 10 illustrates a psychrometric chart of the energy exchange system 300 (shown in FIG. 9), according to an embodiment. In this embodiment, the system 300 is operating during a winter mode with the plate heat exchanger 314 functioning in a pre-heat and re-cool configuration. The bypass damper 324 and pre-delivery damper 332 are closed, and the re-direct damper 330 is opened.

Referring to FIGS. 9 and 10, outside air 1002 enters the supply flow path 304 having a dry bulb temperature of −22° F. and a humidity ratio of 1.5 grains of moisture per pound of dry air. The air 1002 then passes into the energy recovery device 312 within the central sub-path 318. The energy recovery device 312 increases the temperature and humidity of the outside air 1002 yielding air 1004 having an increased temperature and humidity as it passes out of the energy recovery device 312. As shown in the chart, the dry bulb temperature of the air 1004 may be increased to approximately 15° F., while the humidity ratio may be lowered to approximately 10 grains.

The plate heat exchanger 314 then increases the sensible energy of the air 1004. In particular, as the air 1006 passes out of the plate heat exchanger 314 within the central sub-path 318, the dry bulb temperature of the air 1006 is approximately 30° F., while its humidity ratio remains at 10 grains. After passing through the plate heat exchanger 314 within the central sub-path 318, the air 1006 then encounters the heating coil (reverse cooling coil) 316. The heating coil 316 heats the air 1006 even further. As shown in FIG. 10, the air 1008 after passing through the heating coil 316 has a dry bulb temperature of approximately 90° F. and a humidity ratio of approximately 10 grains. All the air 1008 is branched off to the re-direct sub-path 326 to the plate heat exchanger 314, which re-cools the air (due to the colder air within the central sub-path 318 cross-flowing through the plate heat exchanger 314). Accordingly, the dry bulb temperature of the air 1010 supplied to the enclosed space 302 is reduced to approximately 75° F., while the humidity ratio of the air 1010 remains at approximately 10 grains, thereby yielding neutral air to the enclosed space 302.

It is understood that in the above described mode of operation, both the re-direct damper 330 and pre-delivery damper 332 may be modulated between fully closed and fully open position in order to provide more or less pre-heat and re-cool to the supply air 308.

The system 300 may be configured for a summer mode of operation. The fluid circulation circuit 302 may be operated during the summer mode of operation to provide additional cooling with respect to the cooling coils 316 and 350. During a winter mode of operation, the fluid circulation circuit 302 may be deactivated, or reversed, as noted above, to provide additional heating. Further, the bypass damper 324 may be opened, while the re-direct and pre-delivery dampers 330 and 332 may be closed. Therefore, the outside air is heated and humidified by the energy recovery device 312, and is then directly shunted to the delivery sub-path 322 by way of the bypass sub-path 320. The heating coil 352 may be operated to further heat the air supplied to the enclosed space 302, thereby providing an efficient heating system due to the air pressure drop and corresponding motor brake horsepower of the air moving device being significantly reduced.

Figure 11:
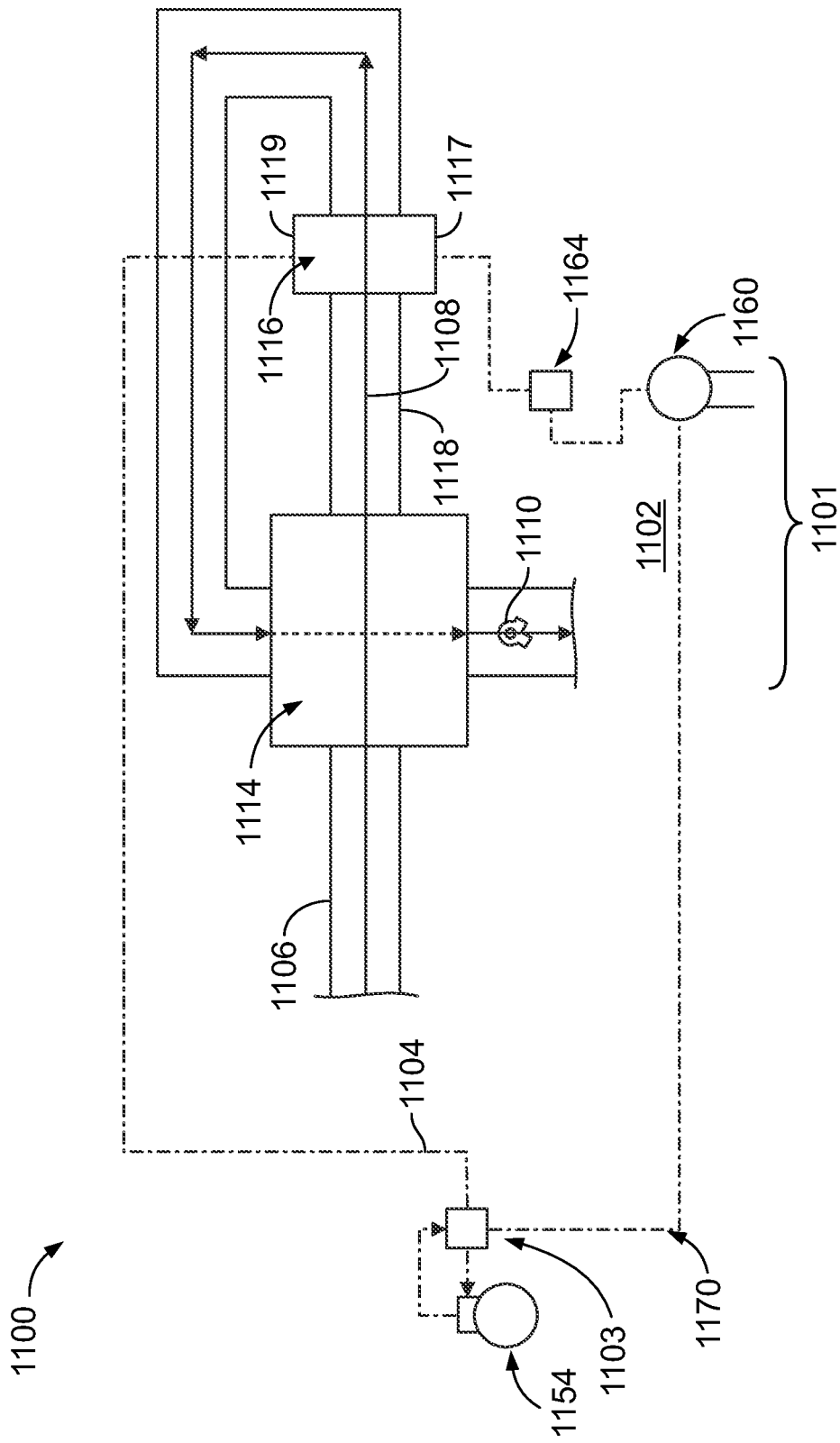
FIG. 11 illustrates a schematic view of an energy exchange system, according to an embodiment.

FIG. 11 illustrates a schematic view of an energy exchange system 1100, according to an embodiment. The system 1100 is similar to the system 300 shown in FIG. 9. However, the system 1100 may not include an energy recovery device, nor have a return flow path from the enclosed space. FIG. 11 illustrates a 100% outside air make-up air system. The fluid circulation circuit 1101 includes a compressor or coolant pump 1154 connected to a refrigerant switching device 1103 that may be used to switch the cooling coil 1116 to a heating coil. The refrigerant switching device 1103 may also connect to the heat exchanger 1160 that is used to absorb heat from a source loop in winter operation. The metering device 1164 may also connect to both the heat exchanger 1160 and to an inlet end 1117 of the heating coil 1116. An outlet end 1119 of the heating coil 1116 may then connect back to the compressor or coolant pump 1154. In operation, the compressor or coolant pump 1154 circulates refrigerant throughout the refrigerant system.

The system 1100 may also include an air inlet 1104 fluidly connected to a supply flow path 1106. The supply flow path 1106 may channel air 1108 to the enclosed structure 1102. The air 1108 in the supply flow path 1106 may be moved through the supply flow path 1106 by a fan or fan array 1110. Air from the supply flow path 1106 is channeled to the plate heat exchanger 1114, which pre-heats and increases the sensible energy of the supply air 1108. After passing through the plate heat exchanger 1114 within the central sub-path 1118, the supply air then encounters the heating coil (reverse cooling coil) 1116. The heating coil 1116 heats the supply air even further. All the supply air 1108 is re-directed to the plate heat exchanger 1114, which re-cools the supply air. The pre-heat and re-cool configuration is used to offset the operating conditions of a refrigerant heating system, in order to provide operation throughout the entire year, thereby improving the heat pump coefficient of performance (COP) by increasing the input temperature at coil 1116, for instance, and reducing and/or eliminating the need for any auxiliary pre-heating devices.

Figure 12:
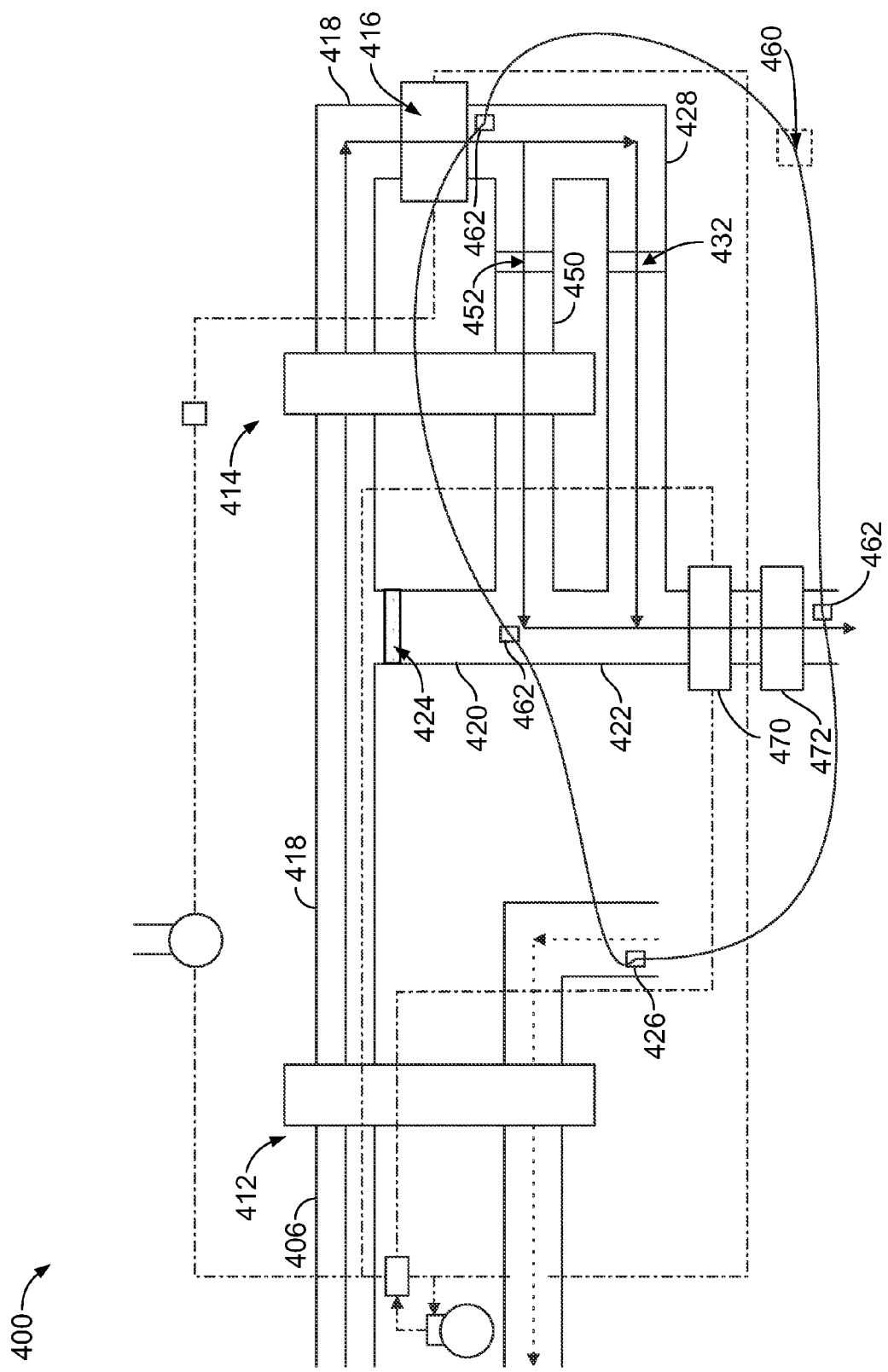
FIG. 12 illustrates a schematic view of an energy exchange system, according to an embodiment.

FIG. 12 illustrates a schematic view of an energy exchange system 400, according to an embodiment. The system 400 is similar to the system 300 shown in FIG. 9, except, instead of a plate heat exchanger, a sensible heat exchanger 414, such as a sensible wheel or heat pipe, is disposed within a central sub-path 418 of the supply flow path 406. A bypass sub-path 420 branches off from the central sub-path 418 upstream from the sensible heat exchanger 414. A cooling coil 416 is disposed within the central sub-path 418 downstream from the sensible heat exchanger 414. The central sub-path 418 connects to a re-direct sub-path 450 downstream from the cooling coil 416. The sensible heat exchanger 414 is also disposed within the re-direct sub-path 450. The re-direct sub-path 450 connects to a delivery sub-path 422 that also connects to the bypass sub-path 420 downstream from a bypass damper 424. A re-direct damper 452 is disposed within the re-direct sub-path 450 upstream from the sensible heat exchanger 414. The central sub-path 418 also connects to a pre-delivery sub-path 428, having a pre-delivery damper 432 disposed therein.

In a summer mode of operation, as shown in FIG. 10, the bypass damper 424 is closed, while the re-direct damper 452 and the pre-delivery damper 432 are open. Thus, the sensible heat exchanger 414 lowers the temperature of the air, while the cooling coil 416 lowers the temperature of the air and reduces its humidity ratio. A control unit 460 may be in communication with a plurality of sensors 462 within the system 300 to monitor the air temperature and humidity at various points, and adjust the system 300 accordingly (such as by opening and closing dampers 424, 432, and 452, activating or deactivating cooling coil 416, and/or activating or deactivating a heating coil 472). In a winter mode of operation, the bypass damper 424 may be opened, while the dampers 452 and 432 are closed so that pre-conditioned air from the energy recovery device 412 is passed directly to the delivery sub-path 422 and through the heating coil 472.

Figure 13:
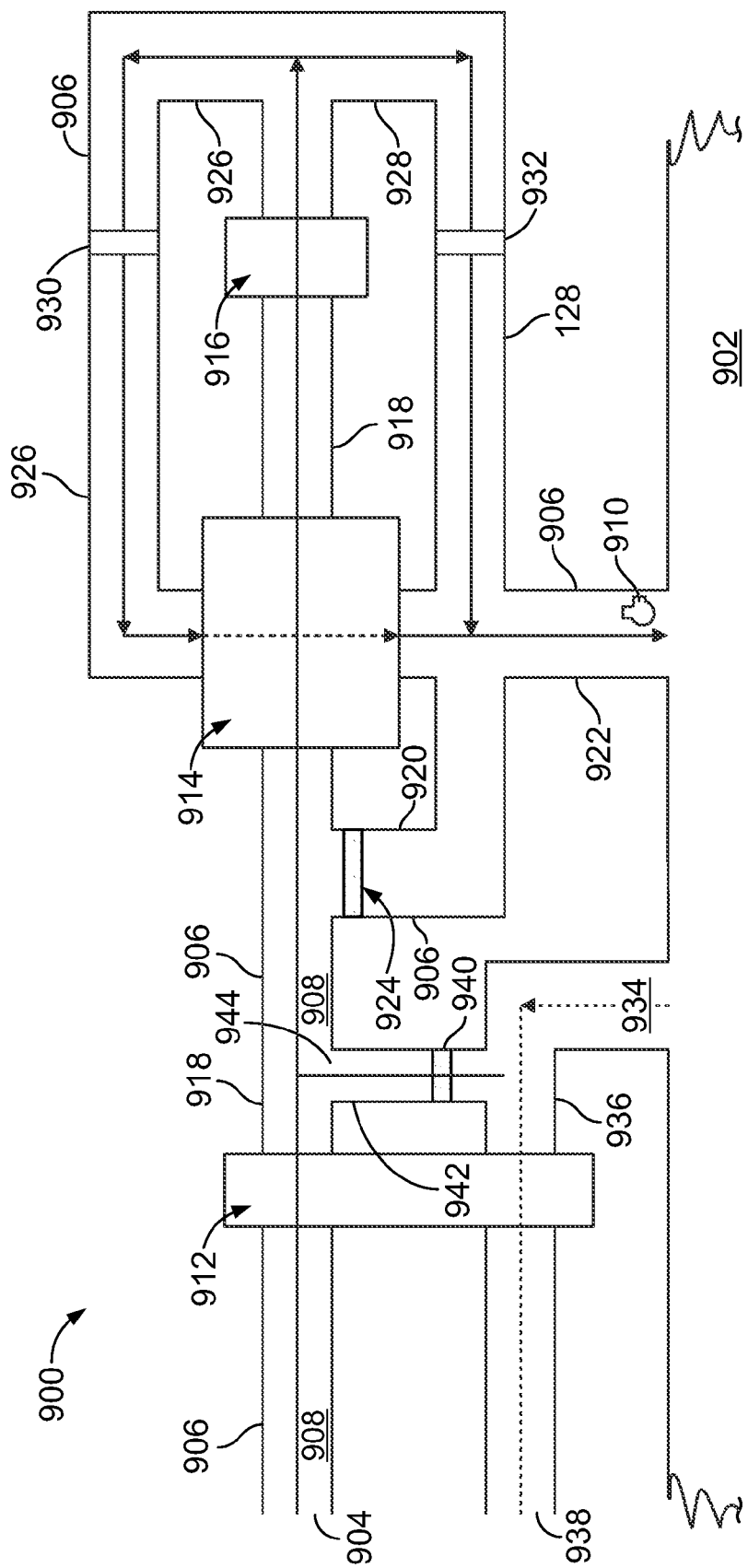
FIG. 13 illustrates a schematic view of an energy exchange system, according to an embodiment.

FIG. 13 illustrates a schematic view of an energy exchange system 900, according to an embodiment. The system 900 is similar to the system 100 shown in FIG. 1. For example, the system 900 includes an energy recovery device 912 disposed in a supply flow path 906 and a return flow path 936. A plate heat exchanger 914 and a cooling coil 916 are disposed within a central sub-path 918 of the supply flow path 906 downstream from the energy recovery device 912. A distal end of the central sub-path 918 branches off into a re-direct sub-path 926 and a pre-delivery sub-path 928. A bypass damper 924 is disposed within a bypass sub-path 920. A re-direct damper 930 is disposed within the re-direct sub-path 926, and a pre-delivery damper 932 is disposed within the pre-delivery sub-path 928.

However, a recirculation damper 940 may be disposed within the recirculation sub-path 942 upstream from the energy recovery device 912. Accordingly, in this embodiment the recirculation damper 940 would be in an open position. Return air 934 from the enclosed structure 902 passes into a return flow path 936, then return air 934 would be drawn into the recirculation sub-path 942, through the opened recirculation damper 940 and return air would be mixed with air 908 in the supply flow path 906. Accordingly, little or no return air 934 would pass through the energy recovery device 912 and little or no return air 934 would be exhausted to the outside environment through an air outlet 938. During unoccupied, night setback operation or when fresh air ventilation requirements are reduced, the system 900 is able to respond to both space temperature and humidity load variations while minimizing the need to condition unnecessary outside air.

Figure 14:
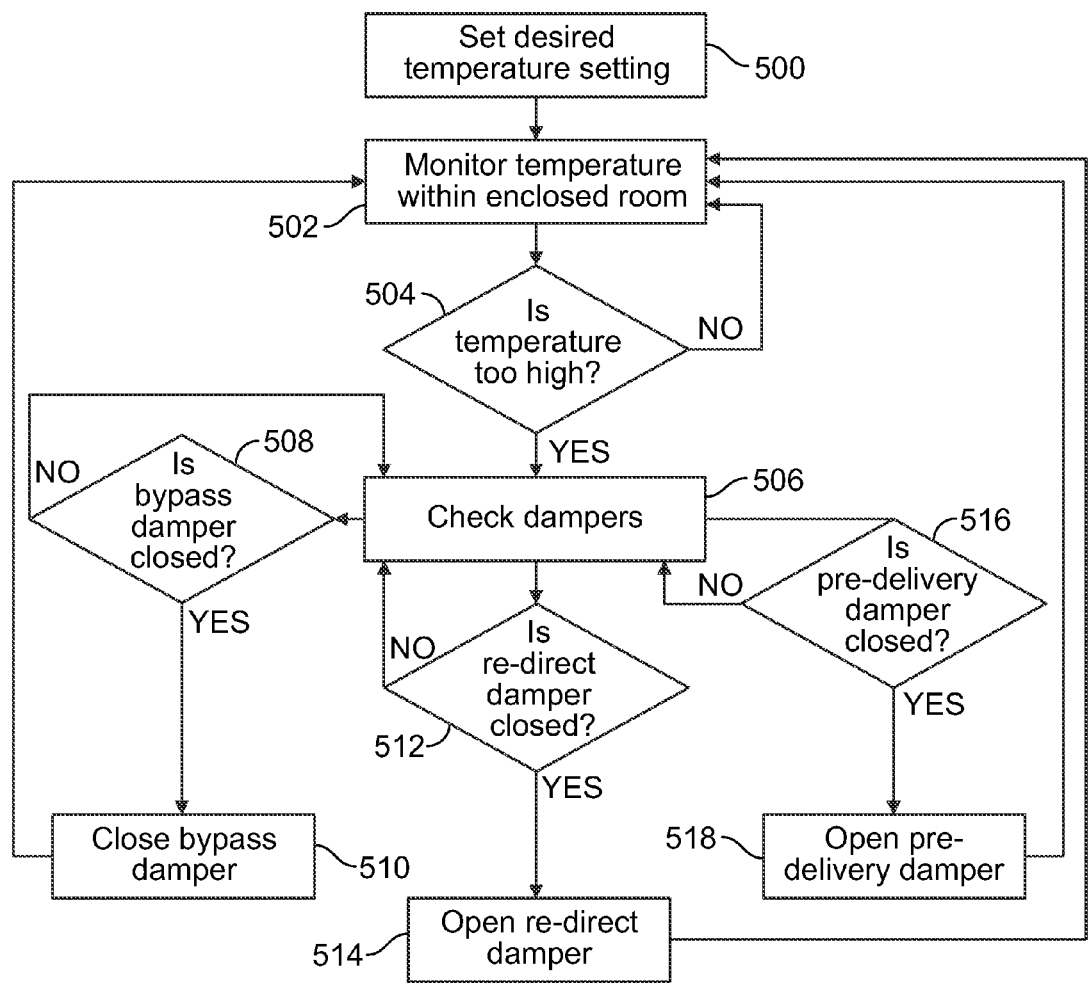
FIG. 14 illustrates a flow chart of an operating process for an energy exchange system when a temperature of supply air within an enclosed room is too high, according to an embodiment.

FIG. 14 illustrates a flow chart of an operating process for an energy exchange system when a temperature of supply air within an enclosed room is too high, according to an embodiment. At 500, an operator sets the desired temperature setting for an enclosed room. Next, at 502, the temperature of the room is monitored by the operator and/or a control unit. At 504, the operator determines if the temperature within the enclosed room is too high. If not, the process returns to 502. If the temperature is too high, the dampers and cooling coil leave air temperature are checked at 506.

At 508, the bypass damper is checked to determine if it is open. If not, the process returns to 506. If the bypass damper is open, the bypass damper is closed at 510. Closing the bypass damper forces supply air into the central sub-path toward the sensible heat exchanger, such as a plate heat exchanger, and the cooling coil, which cools and/or dehumidifies the air.

At 512, the re-direct damper is checked to determine if it is closed. If not, the process returns to 506. If the re-direct damper is closed, the re-direct damper is then opened at 514.

Opening the re-direct damper ensures that the supply air will pass through the cooling coil, which will cool the air. The process then returns to 502.

If the air temperature is still too high, the pre-delivery damper is checked to determine if it is closed at 516. If not, the process returns to 506. If the pre-delivery damper is closed, the pre-delivery damper is opened at 518. Opening the pre-delivery damper ensures that at least a portion of the supply air passes directly from the cooling coil to the delivery sub-path that supplies air to the enclosed room.

If the air temperature is still too high in the enclosed room, the leaving air temperature off the cooling coil may be checked to determine if the temperature may be further lowered. If so, the temperature off the cooling coil may be lowered.

Figure 15:
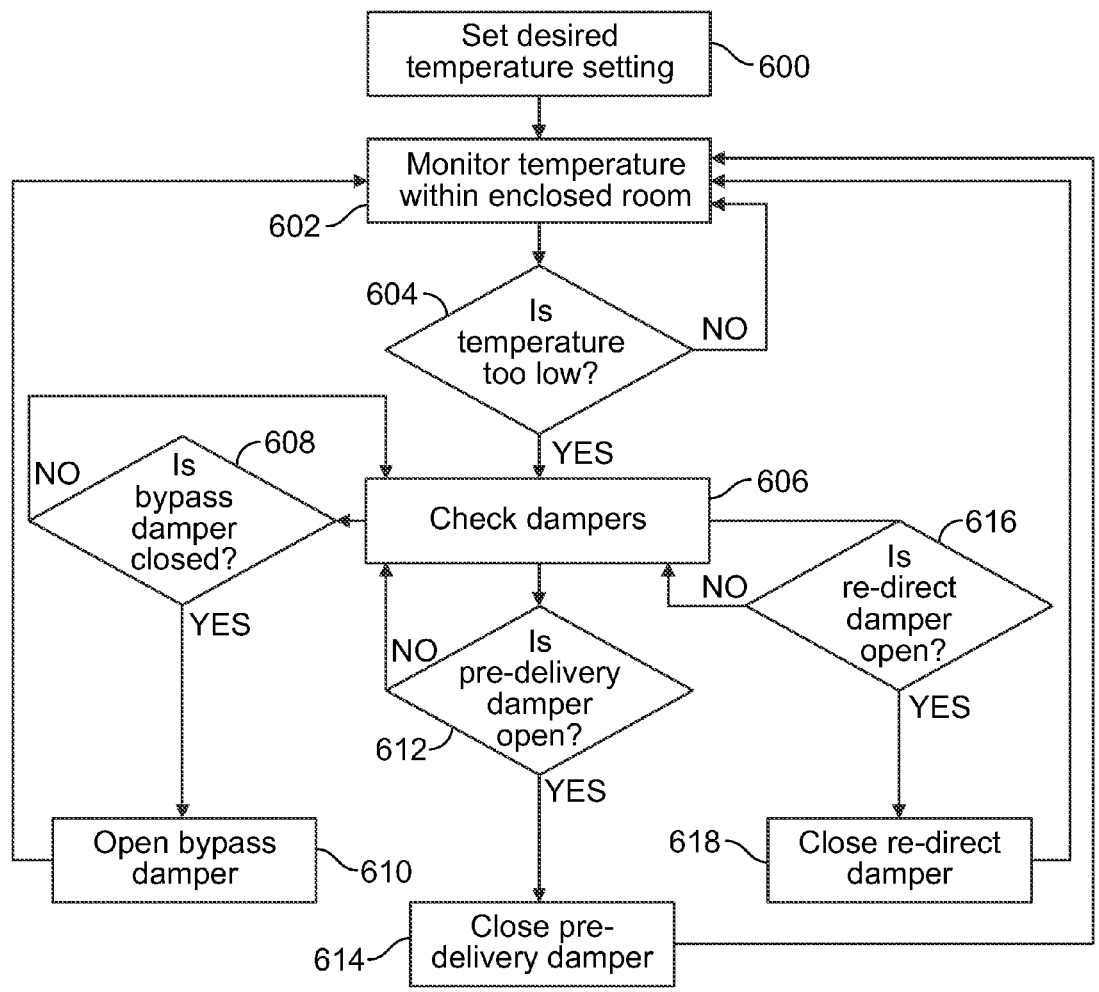
FIG. 15 illustrates a flow chart of an operating process for an energy exchange system when a temperature of supply air within an enclosed room is too low, according to an embodiment.

FIG. 15 illustrates a flow chart of an operating process for an energy exchange system when a temperature of supply air within an enclosed room is too low, according to an embodiment. At 600, an operator sets the desired temperature setting for an enclosed room. Next, at 602, the temperature of the room is monitored by the operator and/or a control unit. At 604, the operator determines if the temperature within the enclosed room is too low. If not, the process returns to 602. If the temperature is too low, the dampers and cooling coil leave air temperature are checked at 606.

At 608, the bypass damper is checked to determine if it is closed. If not, the process returns to 606. If the bypass damper is closed, the bypass damper is opened at 610. Opening the bypass damper allows at least a portion of supply air to bypass the sensible heat exchanger and the cooling coil and pass directly to the enclosed room.

At 612, the pre-delivery damper is checked to determine if it is opened. If not, the process returns to the 606. If the pre-delivery damper is opened, the pre-delivery damper is closed at 614. Closing the pre-delivery damper ensures that at least a portion of the supply air does not pass directly from the cooling coil to the delivery sub-path that supplies air to the enclosed room.

If the air temperature is still too low in the enclosed room, the leaving air temperature off the cooling coil may be checked to determine if the temperature can be raised. If so, the temperature off the cooling coil may be increased.

If the air temperature is still too low, at 616, the re-direct damper is checked to determine if it is open. If not, the process returns to 606. If the re-direct damper is open, the re-direct damper is then closed at 618. Closing the re-direct and pre-delivery dampers ensures that the supply air will bypass the sensible heat exchanger and the cooling coil and pass directly to the enclosed room.

Figure 16:
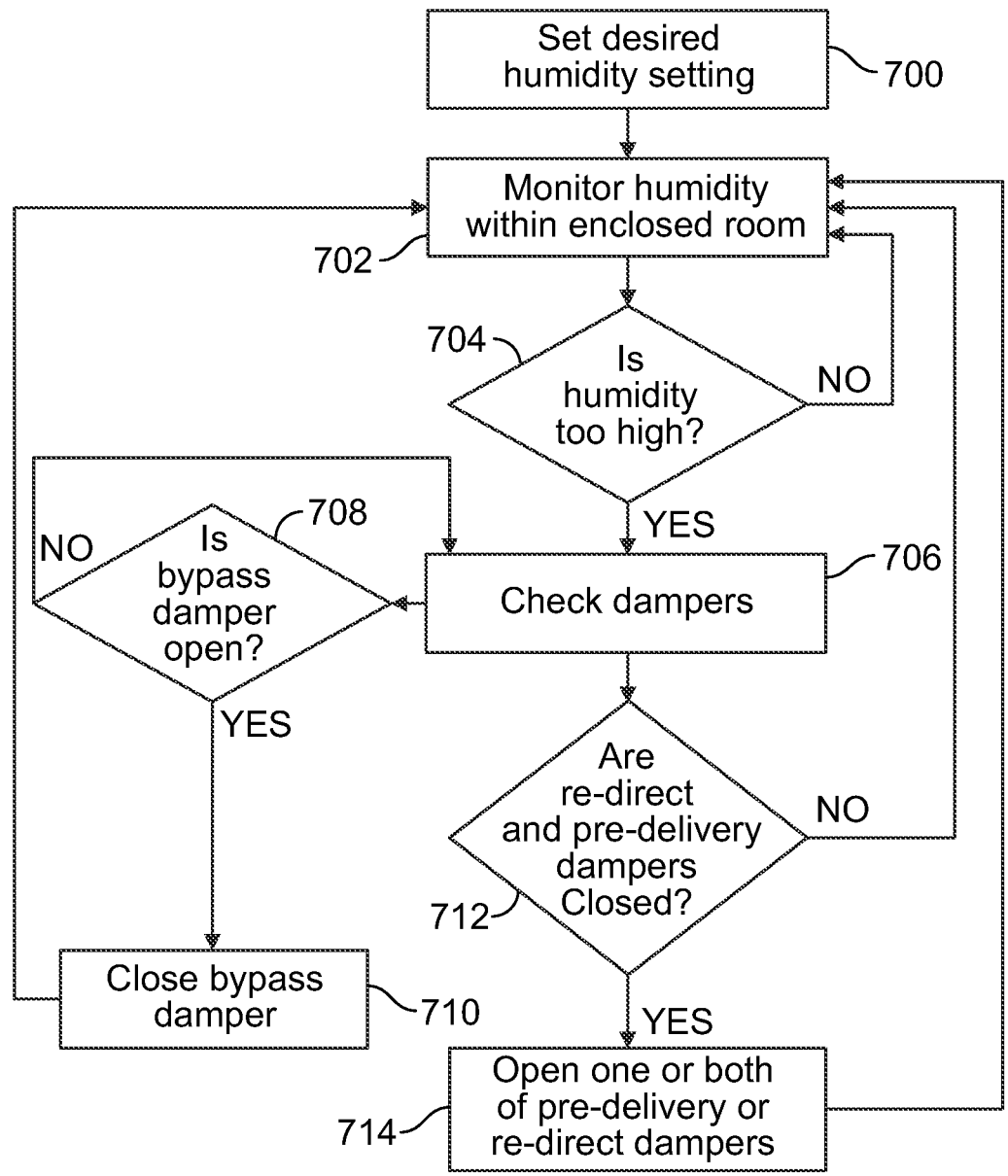
FIG. 16 illustrates a flow chart of an operating process for an energy exchange system when a humidity of supply air within an enclosed room is too high, according to an embodiment.

FIG. 16 illustrates a flow chart of an operating process for an energy exchange system when a humidity of supply air within an enclosed room is too high, according to an embodiment. At 700, an operator sets the desired humidity setting for an enclosed room. Next, at 702, the humidity of the room is monitored by the operator and/or a control unit. At 704, the operator determines if the humidity within the enclosed room is too high. If not, the process returns to 702. If the humidity is too high, the dampers and cooling coil leave air temperature and/or conditions are checked at 706.

At 708, the bypass damper is checked to determine if it is open. If not, the process returns to 706. If the bypass damper is open, the bypass damper is closed at 710. Closing the bypass damper forces supply air into the central sub-path toward the sensible heat exchanger, such as a plate heat exchanger, and the cooling coil, which dehumidifies the air.

At 712, the re-direct and pre-delivery dampers are checked to determine if they are closed. If not, the process returns to 706. If the re-direct and pre-delivery dampers are closed, then one or both of the dampers is opened at 714, thereby ensuring that the supply air passes through the cooling coil, which dehumidifies the air. The process then returns to 702.

If the humidity within the enclosed room is too high, the leaving air temperature off the cooling coil may be checked to determine if the temperature can be lowered further. If so, the temperature off the cooling coil is lowered. Lowering the temperature off the cooling coil dehumidifies the air further. In order to prevent over-cooling of the enclosed space, the operator and/or a control unit may open the re-direct damper further.

Figure 17:
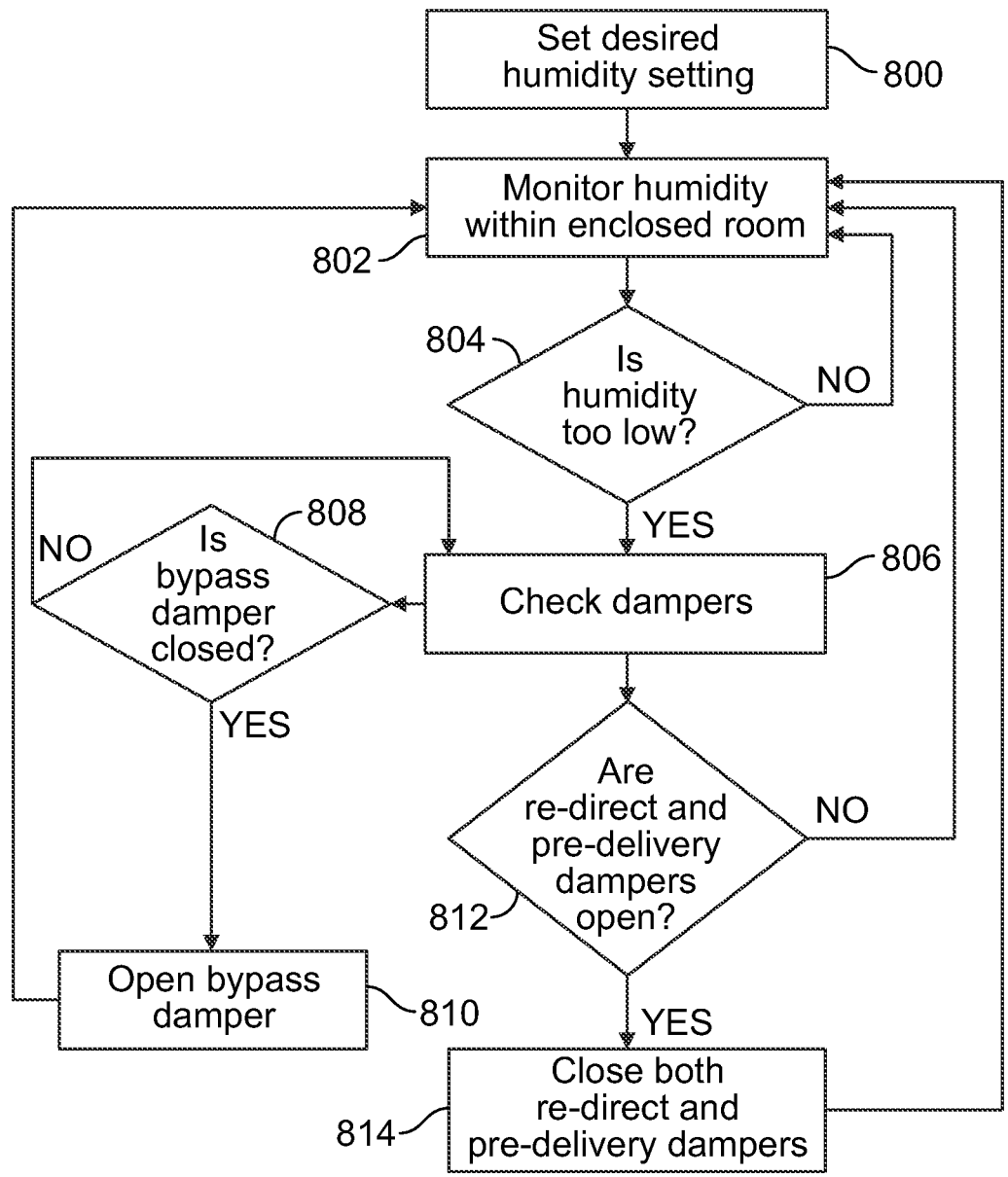
FIG. 17 illustrates a flow chart of an operating process for an energy exchange system when a humidity of supply air within an enclosed room is too low, according to an embodiment.

FIG. 17 illustrates a flow chart of an operating process for an energy exchange system when a humidity of supply air within an enclosed room is too low, according to an embodiment. At 800, an operator sets the desired humidity setting for an enclosed room. Next, at 802, the humidity of the room is monitored by the operator and/or a control unit. At 804, the operator determines if the humidity within the enclosed room is too low. If not, the process returns to 802. If the humidity is too low, the dampers and cooling coil leave temperature and/or conditions are checked at 806.

At 808, the bypass damper is checked to determine if it is closed. If not, the process returns to 806. If the bypass damper is closed, the bypass damper is opened at 810. Opening the bypass damper ensures that at least a portion of the supply air is bypassed to the enclosed room, and does not pass through the cooling coil.

At 812, the re-direct and pre-delivery dampers are checked to determine if they are opened. If not, the process returns to 806. If the re-direct and/or pre-delivery dampers are opened, then one or both of the dampers are closed at 814, thereby ensuring that at least a portion of the supply air is bypassed to the enclosed room, and does not pass through the cooling coil. The process then returns to 802.

If the humidity within the enclosed room is too low, the leaving air temperature off the cooling coil may be checked to determine if the temperature can be raised further. If so, the temperature off the cooling coil is increased. Increasing the temperature off the cooling coil decreases dehumidification. In order to prevent over-heating of the enclosed space, the operator and/or a control unit may open the pre-delivery damper further.

It is to be understood that the processes shown and described with respect to FIGS. 14-17 may be performed simultaneously. That is, an operator and/or a control unit may continually monitor the temperature and humidity of an enclosed room and adjust the energy exchange system in order to provide supply air that meets the desired temperature and humidity settings. Additionally, the dampers may be modulated between fully-open and fully-closed positions to adjust temperature and humidity settings. That is, a damper may be moved into a partially closed position in order to restrict air flow therethrough.

Thus, embodiments provide a system and method of independently controlling the temperature and humidity of air supplied to a room or other such enclosed space. Embodiments provide a system and method to modulate a sensible heat exchanger, such as a plate heat exchanger, independently from a cooling coil, such as through the use of a bypass damper in a bypass sub-path of a supply flow path, thereby increasing the control precision of the system. In this manner, embodiments are able to respond to space temperature and humidity variations independently.

Embodiments also provide a system and method for supplying neutral air (that is, air having a temperature of 70-75° F.) to an enclosed space at lower dew points.

Embodiments also provide a system and method of heating an enclosed space during a winter mode of operation while using less fan power (as portions of the system are bypassed).

Embodiments also provide a system and method of utilizing a plate heat exchanger in a pre-heating and re-cooling configuration during a winter mode of operation, thereby allowing a refrigeration system to operate at very low ambient conditions with minimal or no pre-heating coil requirements.

Embodiments also provide a system and method of utilizing a heat pump system and a plate heat exchanger in a pre-heating and re-cooling configuration during a winter mode of operation, thereby allowing the heat pump system to operate at a higher efficiency and provide a higher COP.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An energy exchange system configured to provide supply air to an enclosed structure, the system comprising:
    a supply flow path including a central sub-path connected to a bypass sub-path that is connected to a delivery sub-path that connects to the enclosed structure;
    a sensible heat exchanger configured to condition the supply air disposed within the central sub-path, wherein the bypass sub-path connects to the central sub-path upstream from the sensible heat exchanger within the central sub-path;
    a first coil configured to further condition the supply air disposed within the central sub-path downstream from the sensible heat exchanger; and
    a bypass damper disposed within the bypass sub-path, wherein the bypass damper is configured to be selectively opened and closed, wherein the bypass damper allows at least a portion of the supply air to pass through the bypass sub-path into the delivery sub-path and bypass the sensible heat exchanger and the first coil when the bypass damper is open.

2. The system of claim 1, wherein the supply flow path further includes:
    a re-direct sub-path that reconnects to the sensible heat exchanger, wherein the sensible heat exchanger is configured to receive re-directed supply air within the re-direct sub-path and pass the re-directed supply air to the delivery sub-path; and
    a pre-delivery sub-path that is connected between the central sub-path and the delivery sub-path.

3. The system of claim 2, further comprising a re-direct damper disposed within the re-direct sub-path, wherein the re-direct damper is configured to be selectively opened and closed in order to open and close, respectively, the re-direct sub-path.

4. The system of claim 2, further comprising a pre-delivery damper disposed within the pre-delivery sub-path, wherein the pre-delivery damper is configured to be selectively opened and closed in order to open and close, respectively, the pre-delivery sub-path.

5. The system of claim 1, wherein the sensible heat exchanger comprises a plate heat exchanger.

6. The system of claim 5, wherein the plate heat exchanger comprises a plurality of parallel plates defining first and second levels configured to allow supply air to pass therethrough, wherein the first level is oriented parallel with a first axis, while the second level is oriented parallel with a second axis, which is perpendicular to the first axis.

7. The system of claim 1, wherein the sensible heat exchanger comprises a sensible wheel or a heat pipe.

8. The system of claim 1, further comprising an energy recovery device having a portion disposed within the central sub-path upstream from the bypass sub-path and the sensible heat exchanger, wherein the energy recovery device is configured to pre-condition the supply air.

9. The system of claim 1, wherein the first coil comprises sealed tubes containing fluid.

10. The system of claim 1, further comprising at least one temperature or humidity sensor within the supply flow path.

11. The system of claim 1, further comprising a control unit operatively connected to the bypass damper.

12. The system of claim 1, further comprising a second coil disposed within the delivery sub-path, wherein the second coil is configured to re-heat or re-cool the supply air before the supply air passes into the enclosed structure.

13. The system of claim 1, further comprising a fluid circulation circuit connected to the first coil, wherein the fluid circulation circuit is configured to circulate fluid to the first coil.

* * * * *